(12) United States Patent
Israel

(10) Patent No.: US 10,259,137 B2
(45) Date of Patent: Apr. 16, 2019

(54) SPRAY PRINTING CONSTRUCTION

(71) Applicant: Noah Israel, Kingston, WA (US)

(72) Inventor: Noah Israel, Kingston, WA (US)

(*) Notice: Subject to any disclaimer, the term of this patent is extended or adjusted under 35 U.S.C. 154(b) by 712 days.

(21) Appl. No.: 14/627,787

(22) Filed: Feb. 20, 2015

(65) Prior Publication Data

US 2015/0239148 A1  Aug. 27, 2015

Related U.S. Application Data

(60) Provisional application No. 61/942,987, filed on Feb. 21, 2014.

(51) Int. Cl.
*B28B 1/00* (2006.01)
*B33Y 10/00* (2015.01)
(Continued)

(52) U.S. Cl.
CPC ............ *B28B 1/001* (2013.01); *B29C 64/106* (2017.08); *B29C 64/241* (2017.08);
(Continued)

(58) Field of Classification Search
CPC ..... B29C 64/20; B29C 64/227; B29C 64/232; B29C 64/236; B29C 64/241;
(Continued)

(56) References Cited

U.S. PATENT DOCUMENTS

| 2,682,235 A | 6/1954 | Buckminster |
| 2,766,064 A | 10/1956 | Schweitzer |

(Continued)

FOREIGN PATENT DOCUMENTS

| CN | 2085825 | 10/1991 |
| EP | 0125776 | 11/1984 |

(Continued)

OTHER PUBLICATIONS

3D Printing in Spherical Space, Update. Datasheet [online]. www.cnczone.com, 2015, 3 pages [retrieved on May 5, 2015]. Retrieved form the internet: <URL: http://www.cnczone.com/forums/dynomotion-kflop-kanalog/266222-3d-printing-spherical-space-update.html>.

(Continued)

*Primary Examiner* — Dah-Wei D. Yuan
*Assistant Examiner* — Stephen A Kitt
(74) *Attorney, Agent, or Firm* — Cesari & Reed LLP; Christian W. Best

(57) ABSTRACT

Systems and methods are disclosed for spray printing construction. In some embodiments, a system may include a rotating truss, which in some embodiments may be arch-shaped. The system may further include a sprayer apparatus configured to connect to and move along the truss, and a processor circuit configured to execute computer instructions to print a building structure using the sprayer apparatus and the rotating truss. In another embodiment, a method may include determining a spray pattern for creating a printable structure at a computer control system, and implementing, on the computer control system, the spray pattern to create the printable structure, including rotating an arched truss system supporting an adjustable spray printer, adjusting a position of the spray printer on the arched truss system, and activating the spray printer to execute the determined spray pattern.

20 Claims, 23 Drawing Sheets

(51) Int. Cl.
  *B33Y 30/00* (2015.01)
  *B33Y 50/02* (2015.01)
  *B29C 64/106* (2017.01)
  *B29C 64/241* (2017.01)
  *B29C 64/386* (2017.01)

(52) U.S. Cl.
  CPC ............ *B29C 64/386* (2017.08); *B33Y 10/00* (2014.12); *B33Y 30/00* (2014.12); *B33Y 50/02* (2014.12)

(58) Field of Classification Search
  CPC ..... B29C 64/379–64/393; B28B 1/001; B05B 13/005; B05B 15/08; B05B 15/10; B33Y 10/00; B33Y 30/00; B33Y 50/02
  See application file for complete search history.

(56) References Cited

U.S. PATENT DOCUMENTS

| | | | |
|---|---|---|---|
| 3,085,366 A | 4/1963 | Jamison | |
| 3,192,668 A | 7/1965 | Grieb | |
| 3,254,459 A | 6/1966 | Bodley | |
| 3,495,365 A | 2/1970 | Blaski | |
| 3,696,566 A | 10/1972 | Langner | |
| 3,909,994 A | 10/1975 | Richter | |
| 3,973,730 A * | 8/1976 | Johnson | B05B 13/005 118/323 |
| 4,474,135 A * | 10/1984 | Bellafiore | B05B 13/005 118/305 |
| 4,710,054 A | 12/1987 | Allen | |
| 5,180,272 A | 1/1993 | Campbell | |
| 5,340,433 A * | 8/1994 | Crump | B22F 3/115 118/202 |
| 5,387,380 A | 2/1995 | Cima et al. | |
| 5,918,438 A | 7/1999 | South | |
| 6,658,812 B1 | 12/2003 | Tomlinson et al. | |
| 6,996,942 B2 | 2/2006 | Geiger | |
| 8,668,974 B2 | 3/2014 | Purdy | |
| 2005/0097830 A1 | 5/2005 | South | |
| 2005/0280185 A1 | 12/2005 | Russell et al. | |
| 2009/0090795 A1 | 4/2009 | Ray | |
| 2013/0295338 A1 | 11/2013 | Keating et al. | |
| 2014/0252668 A1 * | 9/2014 | Austin | B28B 3/20 264/40.7 |

FOREIGN PATENT DOCUMENTS

| | | | |
|---|---|---|---|
| GB | 1361812 | 7/1974 | |
| WO | WO2010019051 | 2/2010 | |
| WO | WO-2013064826 A1 * | 5/2013 | ............... B28B 3/20 |

OTHER PUBLICATIONS

Rotary 3D Printers Under Development. Datasheet [online] www.3ders.org, 2013, 15 pages [retrieved on May 5, 2015]. Retrieved from internet:,<URL: http://www.3ders.org/articles/20131227-rotary-3d-printers-under-development.html>.
CN2085825, Patent Translate, EPO, Jun. 22, 2015, 3 pages.
PCT/US15/16876, Written Opinion from international searching authority, Jun. 22, 2015, 5 pages.
PCT/US15/16876, International Search Report, Jun. 22, 2015, 3 pages.

* cited by examiner

SPRAY PRINTING CONSTRUCTION

CROSS-REFERENCE TO RELATED APPLICATIONS

The present application is a non-provisional application of and claims priority to U.S. provisional patent applications Ser. No. 61/942,987, filed Feb. 21, 2014, entitled "Dome Spray Printing," the contents of which are hereby incorporated by reference in their entirety.

SUMMARY

In some embodiments, a system may include an arch-shaped rotating truss, a sprayer apparatus configured to connect to and move along the arch-shaped rotating truss, and a processor circuit configured to execute computer instructions to print a building structure using the sprayer apparatus and the arch-shaped rotating truss.

In another embodiment, a method may include determining a spray pattern for creating a printable structure at a computer control system, implementing, on the computer control system, the spray pattern to create the printable structure, including rotating an arched truss system supporting an adjustable spray printer, adjusting a position of the spray printer on the arched truss system, and activating the spray printer to execute the determined spray pattern.

In yet another embodiment, an apparatus may include a substantially circular base rail, a set of base carriages configured to interface with the base rail and to move synchronously on the base rail, an arched truss having a first end and a second end supported on the set of base carriages, the arched truss configured to rotate as the base carriages move on the base rail, a spray printing apparatus configured to apply a spray of setting material for fabricating a dome structure and to move along the arched truss, and a processor configured to operate the base carriages and the spray printer apparatus based on building design instructions to fabricate the dome structure.

DETAILED DESCRIPTION

Figure 1:
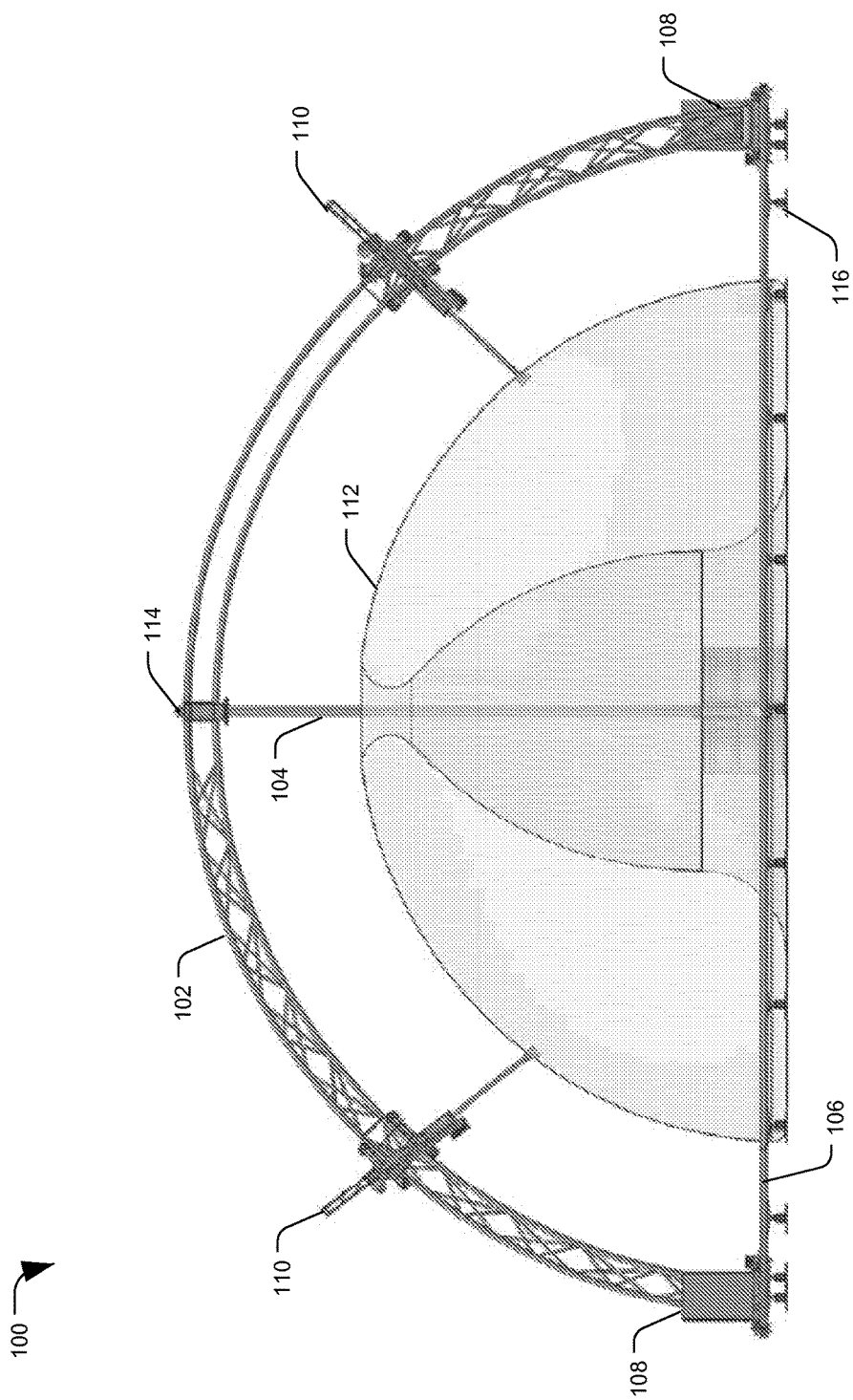
FIG. 1 is a diagram of a system for spray printing construction, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller circuit to control the operations of a spray printing apparatus. Dedicated hardware implementations including, but not limited to, application specific integrated circuits, programmable logic arrays, and other hardware devices can likewise be constructed to control the spray printing apparatus to implement the methods and functions described herein. Further, the methods described herein may be implemented as a device, such as a nonvolatile computer readable storage medium or memory device, including instructions that, when executed, cause a processor to control a spray printing apparatus to perform the methods.

The current disclosure generally relates to the automated construction of buildings, such as domed structures. The disclosure includes methods of using rigid or inflatable forms to place a setting material or cementitious material (e.g. materials which may be applied in a softened or liquid form and which may solidify for construction purposes) against the form to create self-supporting structures. For example, cementitious material may include any of various building materials which may be mixed with a liquid, such as water, to form a cement base substance, and to which an aggregate may be added. Examples may include cements, limes, and mortars.

In some embodiments, dome construction may include applying material to the inner surface of inflatable forms, such as inflatable domes. For example, a shotcrete form of Portland cement (e.g. a common cement mixture conveyed through a hose and pneumatically projected at high velocity) may be applied over a urethane primary layer and a steel rebar matrix. In some embodiments, the material may be applied by human operators using a hose to project the material onto the inflatable form. Some systems also employ hand placement and tying of rebar for reinforcing, also from within the dome. However, the setting material and urethane application can expose operators to toxic fumes and caustic blowback, along with air saturated with suspended particles throughout the application process. In addition, some embodiments of dome building systems may not be suited for accurately and uniformly applying the materials with precision, therefore having to over engineer and over apply materials to meet minimum specifications.

Accordingly, methods and systems are provided which may be used to efficiently and precisely place complex combinations of materials. The disclosed systems and methods can also addresses personal-safety issues of manually placing toxic and caustic materials in the interior of enclosed inflatable formworks. For example, improved techniques may employ robotics and computer control to precisely layer reactive-setting materials to an exterior surface of a base form until the primary layer becomes self-supporting. Subsequent layers can create a structural, insulative, functional, and aesthetic surface. In some embodiments, structures may be printed without the need for any base form, such as by printing the structure from the ground up to be self-supporting. In some embodiments, the applied materials may include non-toxic, non-VOC (volatile organic compound) materials, which may reduce risk to human workers.

An apparatus for spray printing construction may include a motorized system including one or more a sprayer apparatuses for applying setting material to produce a building structure. For example, setting material may be sprayed onto a base form structure, or the structure may be printed without the need for a base form by starting at the base and printing the building up layer-by-layer. The sprayer apparatuses may be configured to move along a rotating frame structure, for example using computer-controlled motorized carriages, and to orient themselves relative to the frame structure to apply setting material to a specified location. The movement of the sprayer apparatuses and application of the setting material may be controlled via computer designs and software stored to a non-volatile computer readable storage medium and specifying the dimensions and features of the building under construction. The sprayer apparatuses may include associated sensors for detecting a distance, angle, or other metrics for the sprayer and the target structure, and information from the sensors may be used by the control software to accurately position and adjust the operation of the sprayer apparatuses.

An example embodiment of a spray printing construction system and a method of use is outlined herein. An X-axis ground or "base" rail or track system may be assembled at the building construction site. For example, the base rail may include multiple rail segments that may be joined together to form a substantially circular rail, supported by a plurality of support elements. In some embodiments, the base rail may be manually leveled. The base rail may also be leveled using an auto-leveling system, which may include the use of one or more carts or carriages riding on the base rail which can automatically detect and adjust a height of the support elements for the base rail. Two motorized base carts or carriages, which may be the same as those used for auto-leveling or different carriages, may be loaded onto the base rail, at approximately diametrically opposite positions on the circular rail.

A bridge or arched truss may also be assembled from multiple segments. Segmented rail and truss elements may allow for easier transportation of the spray printing system. The bridge or arch truss may be connected to the base carriages. For example, an arched truss may connect to a base carriage at each end, such as by a hinged connection. The arch may then be raised up and locked into place. The base carriages may be configured to move synchronously around the base rail, so as to rotate the bridge or arch truss relative to the base rail. In some embodiments, a central shaft or column may be connected to the arch truss at the apex, providing additional support for the arch and a potential avenue of material delivery to the arch.

One or more sprayer apparatuses may be connected to the arch or bridge truss. For example, the sprayer apparatuses may include a motorized carriage capable of traversing the arch or bridge truss, and at least one sprayer for delivery of materials for building construction. Additional elements such as sensors, spooling actuators, or other elements may also be located on the sprayer apparatus.

Printing materials may be loaded into a reservoir for use in the spray printing construction. For example, concrete mixtures, water, and other components may be loaded into a mixer. The materials may be pumped to the sprayer apparatuses as needed for the spray printing construction. Other materials may also be loaded into reservoirs, directly to the sprayer apparatus carts, or elsewhere. For example, spools of reinforcing materials, feedstock, or other materials may be loaded onto one or more spooling actuators, thermal sprayers, or other elements on the arch carriage.

A computer-readable building design may be loaded onto the memory of a computer system. For example, the design may include building specifications such as dimensions, thicknesses, materials, patterns, location of specialized features, other information, or any combination thereof. The building design may be provided to a processor, controller, or other circuit for the spray printing system, such as a computer numerical control (CNC) system. The processor may be on the same computing system on which the building designs were loaded, or may be a separate computing system that receives the designs via a wired or wireless communication link. The processor may be configured to implement instructions for controlling the spray printing system based on the building design. For example, the processor may be able to control the movement of the base carriages to rotate the bridge or arch truss, and may control sprayer apparatuses and associated carriages, sensors, and other actuators. The processor may control the elements of the spray printing system in concert to use the spray printing apparatuses to construct a building according to the building design. For example, the processor may control a speed and pattern of movement for the carriages and printing apparatus, delays to allow the materials to set, spooling actuators to lay reinforcing materials as the structure is printed, printing conductance materials, performing other tasks, or any combination thereof. The processor may alter behavior based on sensor readings, such as for distance or material thickness. For example, the number of passes of the sprayer may depend on a measured thickness, based on a thickness designated in the building design. The described implementation embodiment is just an example, and other embodiments and variations may be employed without departing from the scope of the present disclosure. Specific elements of the spray printing system are described below in regard to the provided figures.

Turning to FIG. 1, a system 100 for spray printing construction is shown, in accordance with certain embodiments of the present disclosure. In an example embodiment, the system may comprise an arched-shaped truss or gantry system 102, sometimes simply referred to as an arch system or the arch. An arch shape may include any curved shape, such as a semi-circle, bell-shaped or parabolic curve, or other shape, and may be continuous or discontinuous (e.g. the arched truss may include multiple sections that may be separated by an air-gap or non-curved element, or other elements). The arch system 102 may rotate around a central column, mast, or shaft 104, for example by moving along a circular base track 106 using synchronized base carriages 108. Base track 106 may be suspended off the ground on a plurality of cross members 116. One or more sprayer apparatuses 110 on arch carriages may be configured to mount to and traverse the arch system 102.

For example, sprayer apparatus 110 may include an arch carriage for adjusting a position of the sprayer apparatus 110 along the arch system 102. The carriage of sprayer apparatus 110 may include one or more sprayers for applying setting material such as shotcrete, which may optionally be applied to a base form 112 such as an inflatable dome. The position and orientation of the sprayers may be automatically or manually adjustable relative to the arch system 102 and the carriage of sprayer apparatus 110. For example, the sprayer position or orientation may be adjusted relative to one or more points of rotation as mounted to the carriage of the sprayer apparatus 110, such as by using a motor controlled by a computing device. Examples of applicable motors may include stepper motors, cordless drill motors, any other kind of electric or gas-powered motor, or any combination thereof. The rotating arch 102, combined with the adjustable position and orientation of the sprayer apparatus 110, lends itself to a high degree of efficient motion-control for delivery of the materials such as concrete, metals, plastics, other reactive compositions, or any other materials selected for use or placement at specific points.

Sprayer apparatus 110 may also include other sprayers, such as thermal sprayers (e.g. plasma or arc spray devices) for applying melted or heated materials such as metals. In some embodiments, sprayer apparatus 110 may also include lasers, masers (e.g. an acronym for microwave amplification by stimulated emission of radiation, and comprising a device to produce coherent electromagnetic waves through amplification by stimulated emission), other magnetic field generators such as electromagnets, other elements to control the placement and curing of materials, or any combination thereof. The sprayer apparatus 110 may also include one or more sensors, such as distance sensors to detect a distance between sprayer apparatus 110 and the base form 112 or material already applied to the base form. Other sensors may also be included, such as precision sonic-sensors for detecting thickness and defects of applied material in real time.

In some embodiments, a central column or shaft 104 may be included into the spray printing construction system 100. Arch system 102 may rotate about column 104, and column 104 may help stabilize arch system 102. Further, column 104 may be used to run cabling, hoses, or similar conduits for electrical and setting materials to the top of the arch system 102. A rotary union 114 may be used to distribute materials and electricity to arch system 102 and sprayer apparatuses 110.

The spray printing construction system 100, including base carriages 108 and the sprayer apparatuses 110, may be controlled with computer control (e.g. CNC—computer numerical control) to coordinate motion, material delivery, and quality control. Combined with the sensors, the system can allow for real-time response to environmental conditions, such as temperature, pressure, air, humidity and other influences which may affect the application and the curing of the material. The computer control system may operate according to computer aided design (CAD), computer aided manufacturing (CAM), or other predetermined computer-compatible designs, as well as other operating software or firmware for control of the dome spray printer system 100.

Applying material precisely to predetermined design specifications with articulated computer-controlled sprayer apparatuses 110 traveling along the rotating arch system 102 can provide for high speed efficient material-delivery. The system 100 may be configured for continuous material metering, mixing, pumping, and precise delivery via the computer-controlled mechanisms. Further, system 100 may include precision sensors for detecting thickness and defects in real time, for example by using an ultrasonic thickness gauge for performing ultrasonic thickness measurement (UTM).

The arched truss gantry system 100 may be designed to be modular and lightweight, which can allow for a high degree of transportability and for quick on-site assembly. For example, track segments of base track 106 and arch segments of arch system 102 may assemble using connectors, such as male and female coupling (e.g. a protrusion on one element may fit into a slot on a second element to establish a connection), through releasable latching mechanisms, through other attachable and detachable coupling systems, or any combination thereof. For example, one or more bolts may be inserted at segment junctures to secure elements together. In some embodiments, component elements of the system 100, such as segments of the arch 102, or the arch 102 and the base carriages 108, may connect via latches which may allow for quick connection and release. In some embodiments, the arch 102 may be secured to the base carriages 108 on the base track 106 with a draw pin through hinge elements on the arch 102 and base carriages 108. The arch 102 may then be lifted upright using the hinge, such as manually or by using hydraulic power. For example, assembly may be performed without the need for a crane or other motorized equipment. However, cranes may also be used to lift the arch or otherwise erect the spray printing construction system 100. Examples of a hinge mechanism are shown in FIGS. 8 and 11-14.

Figure 6:
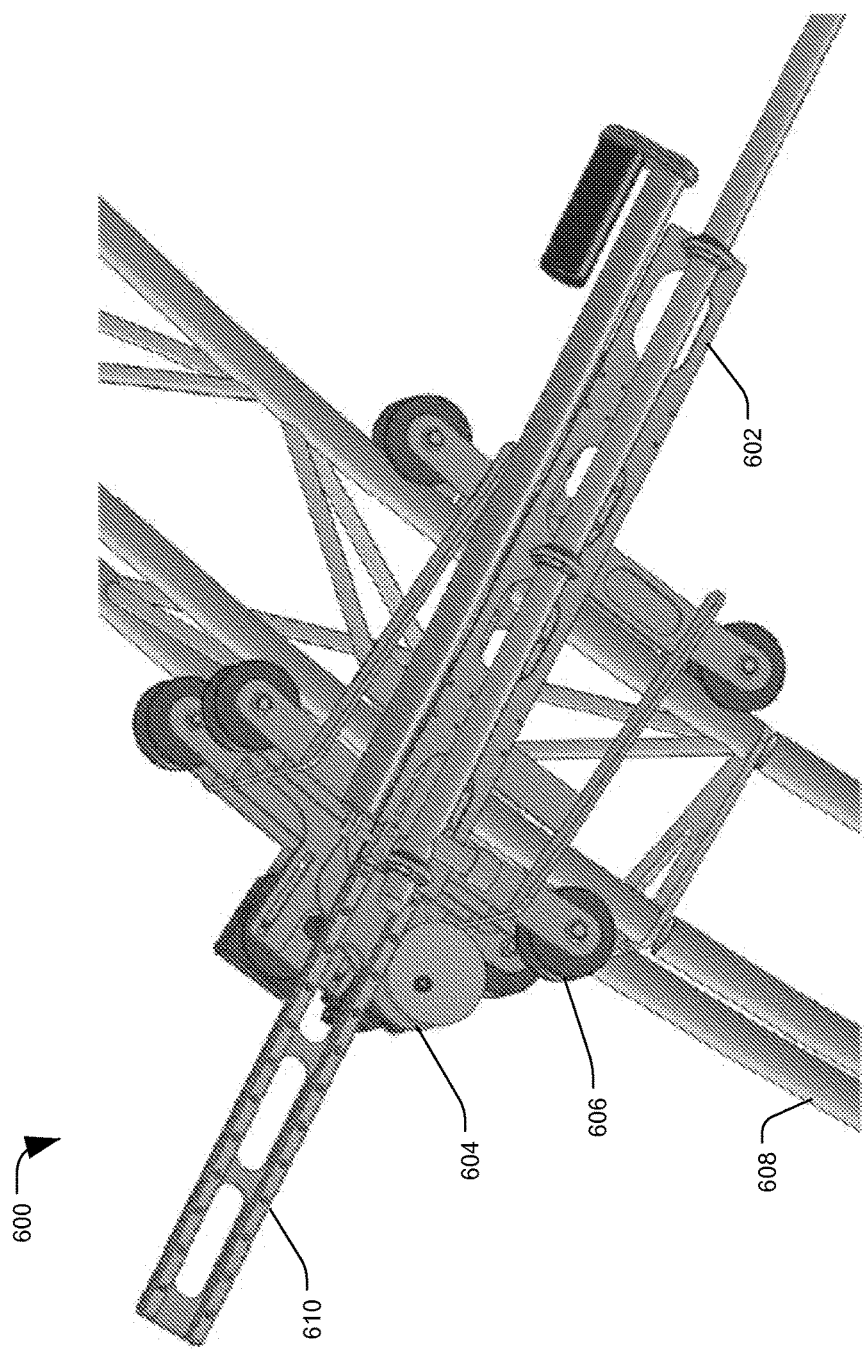
FIG. 6 is a diagram of a system for spray printing construction, in accordance with certain embodiments of the present disclosure.
Figure 7:
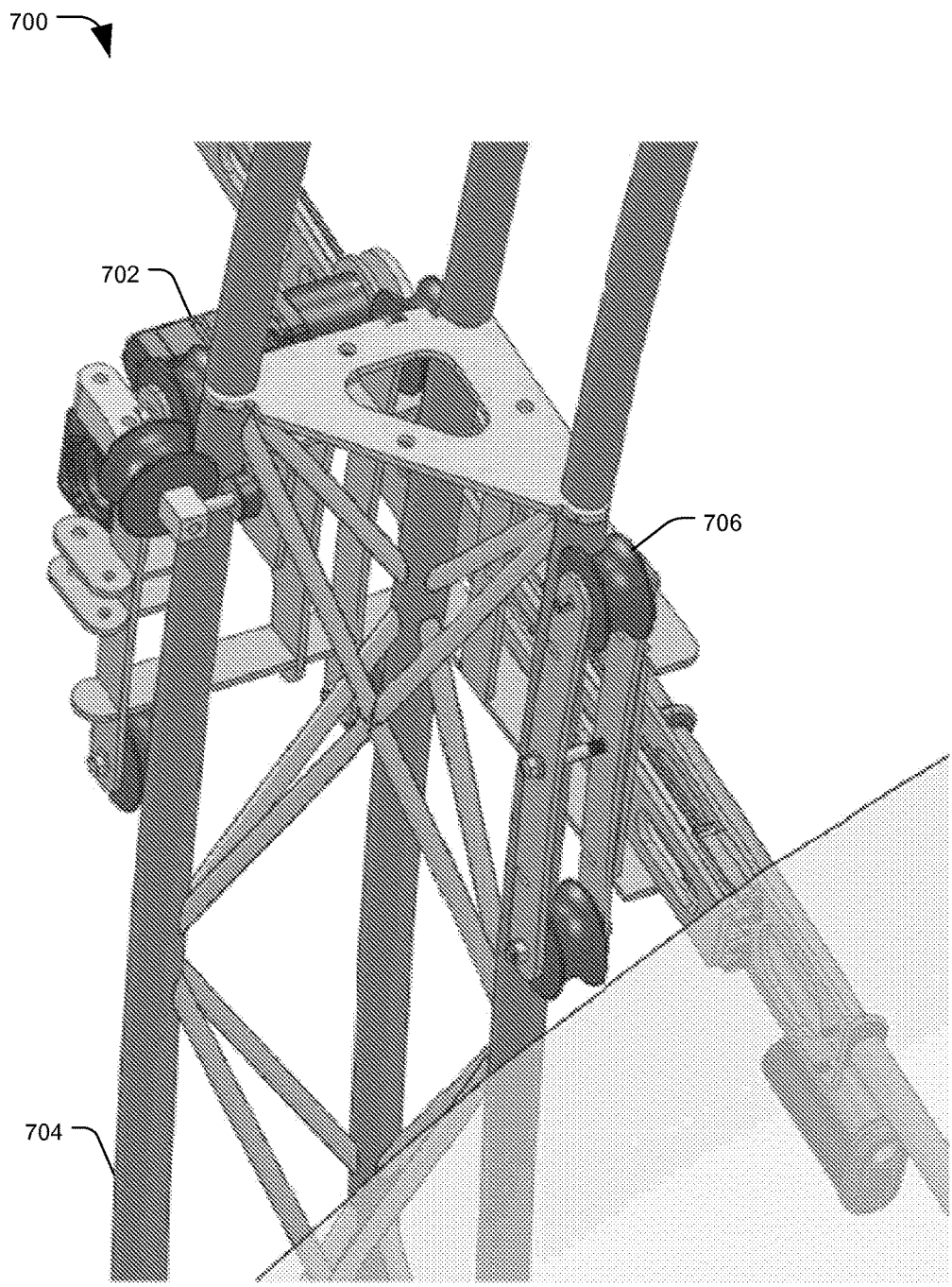
FIG. 7 is a diagram of a system for spray printing construction, in accordance with certain embodiments of the present disclosure.

The arch truss 102 may include a triangulated web-truss design. For example, the arch 102 may include three rails in a triangular pattern, with supporting struts or rods between the rails. The triangulated design provides excellent rigidity and strength. Example embodiments of a triangulated arch truss 102 are shown in FIGS. 6-7.

Figure 2:
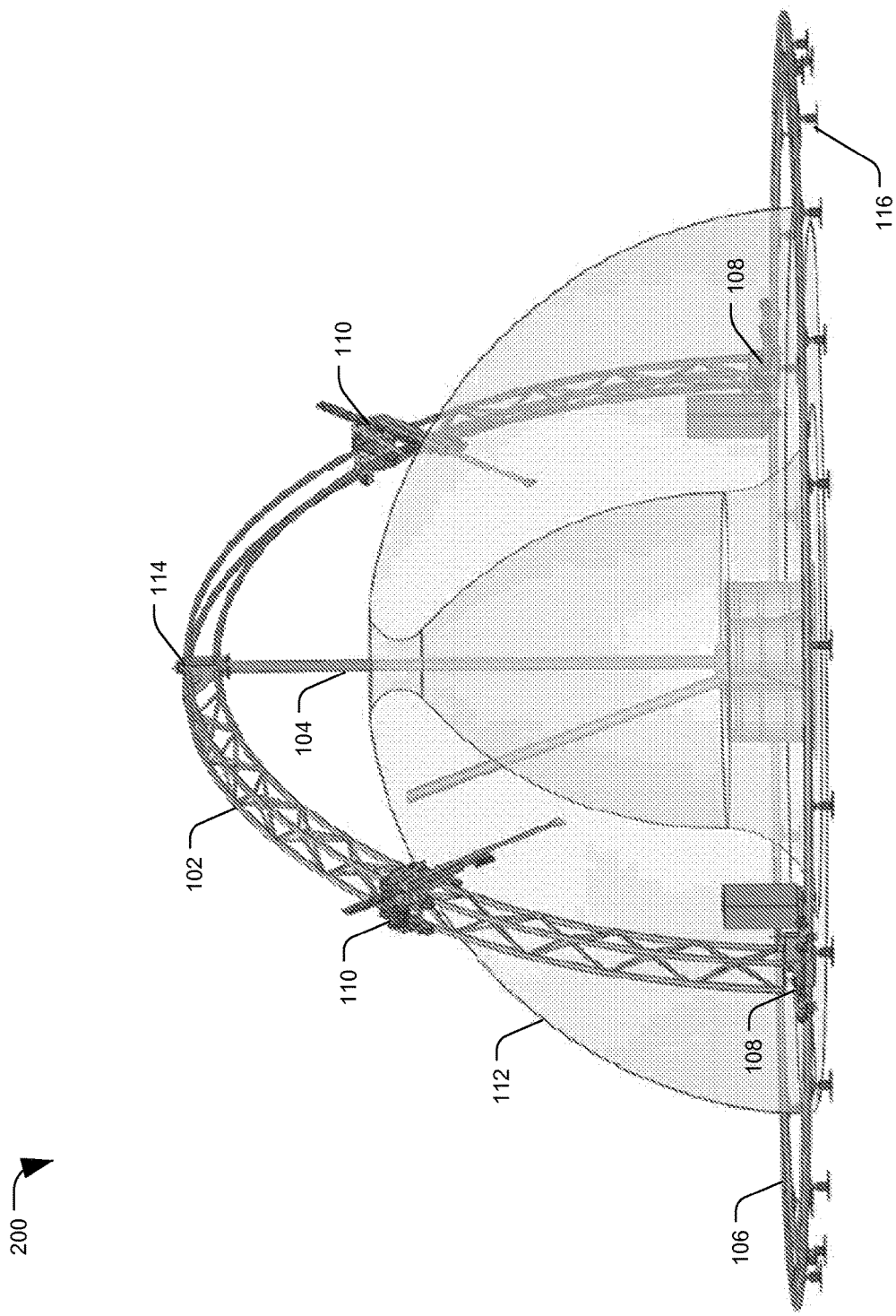
FIG. 2 is a diagram of a system for spray printing construction, in accordance with certain embodiments of the present disclosure.

FIG. 2 depicts a perspective view of a system 200 for spray printing construction, in accordance with certain embodiments of the present disclosure. System 200 may correspond to system 100 of FIG. 1, and may include the same or similar elements with corresponding call numbers.

For example, system 200 may include an arch system 102, which may rotate around a central point 104, which may be a support pillar or shaft that may join to a pivot joint 114 of the arch system 102. The pivot joint 114 may include a rotary union for distribution of power and material to the arch system 102 and sprayer apparatuses 110. Sprayer apparatuses 110 may be configured to attach to rails of the arch system 102, and may apply or spray setting material and other material to the exterior of a base form 112. The arch system 102 may be supported on base carriages 108, which may capable of moving along a base rail 106 to rotate the arch system 102. Base track 106 may be suspended off the ground on a plurality of cross members 116.

Figure 3:
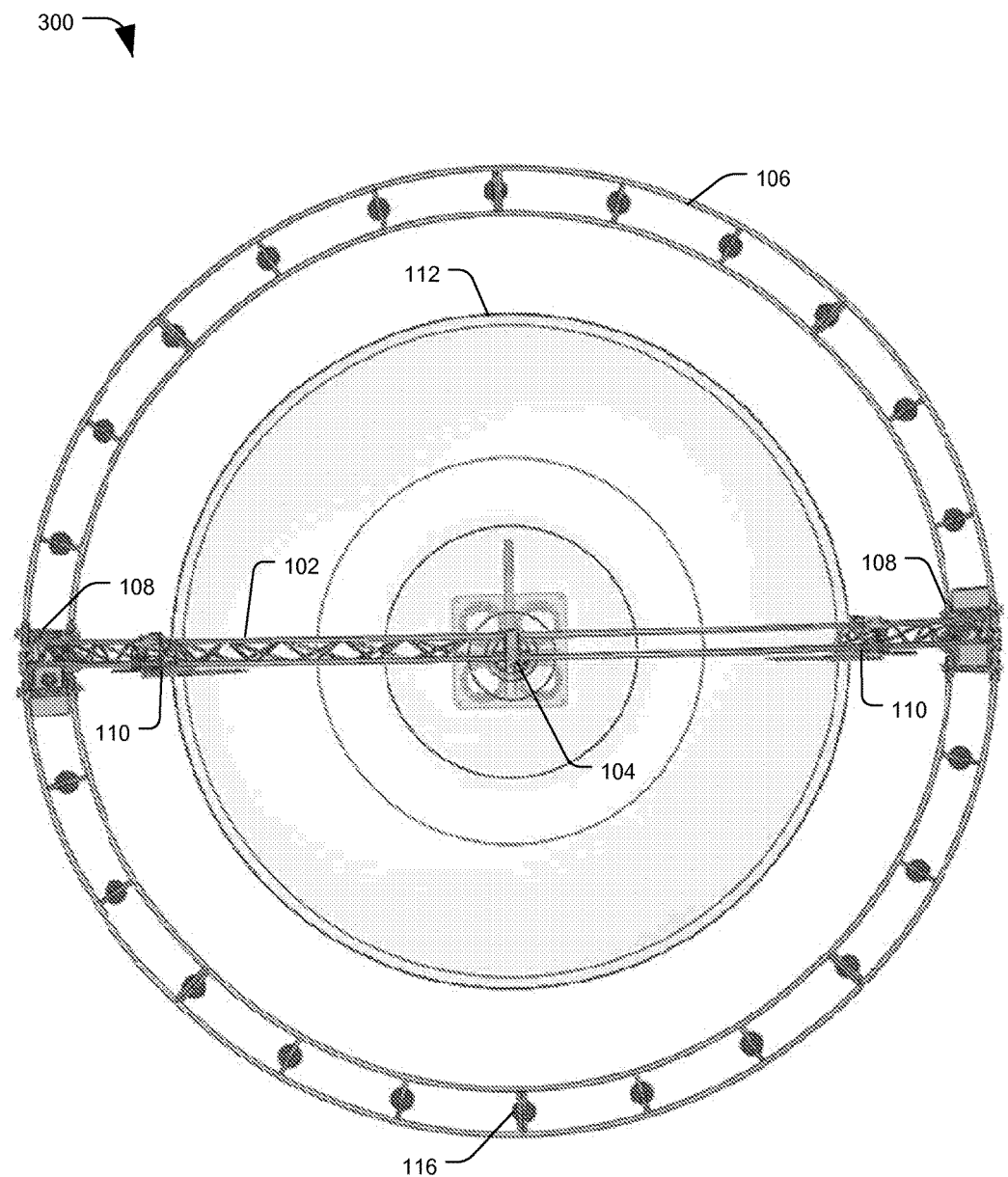
FIG. 3 is a diagram of a system for spray printing construction, in accordance with certain embodiments of the present disclosure.

FIG. 3 depicts a top view of a system 300 for spray printing construction, in accordance with certain embodiments of the present disclosure. System 300 may correspond to system 100 of FIG. 1, and may include the same or similar elements with corresponding call numbers.

For example, system 300 may include an arched truss system 102, which may rotate around a central or pivot point 104. Sprayer apparatuses 110 may be configured to attach to rails of the arch system 102, and may apply or spray setting material and other material to the exterior of a base form 112. The arch system 102 may be supported on base carriages 108, which may capable of traversing along a base rail 106 to rotate the arch system 102. Base track 106 may be supported by a plurality of cross members 116.

Figure 21:
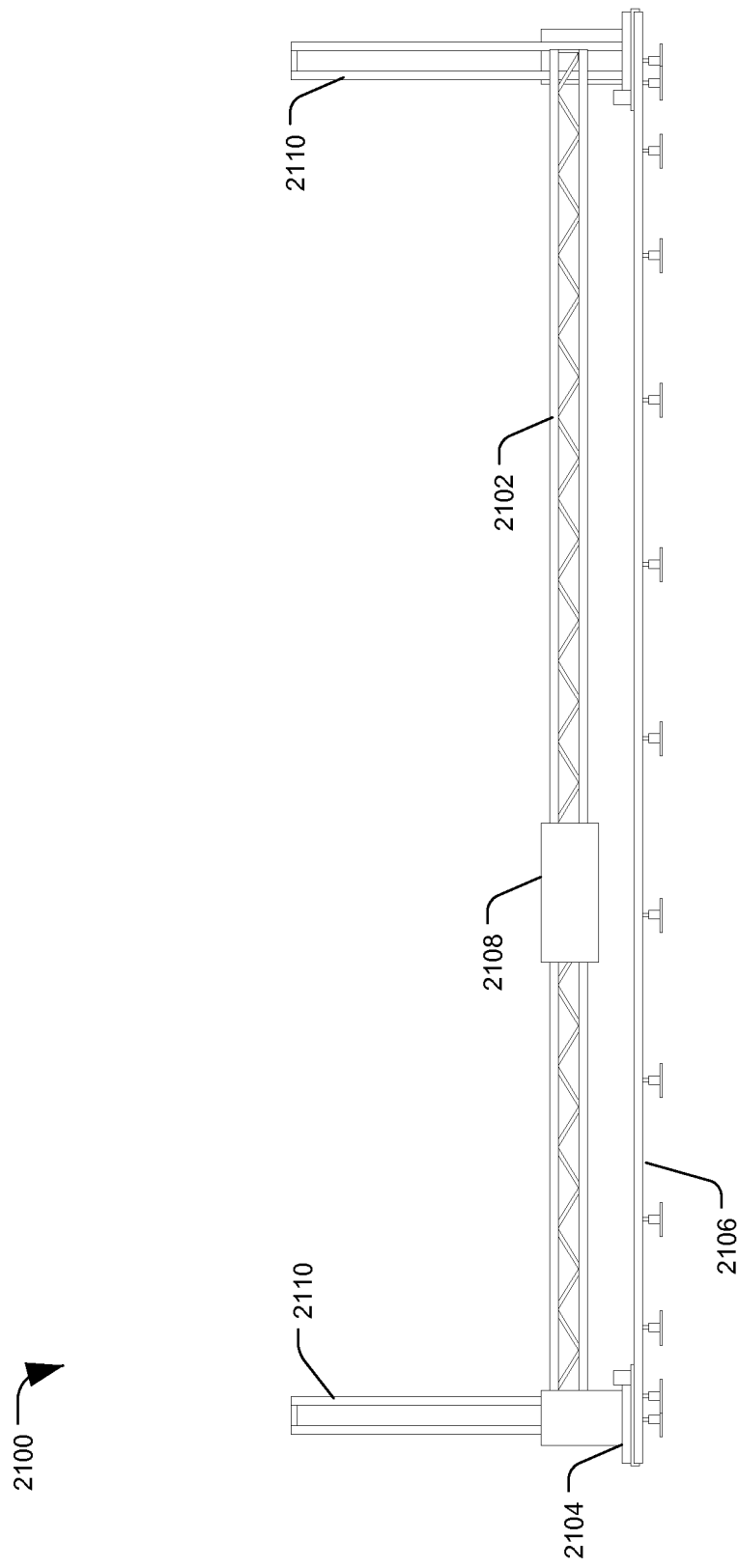
FIG. 21 is a diagram of a system for spray printing construction, in accordance with certain embodiments of the present disclosure.

In some embodiments, arch system 102 may be or include a non-arched truss, such as described in greater detail in regards to FIG. 21.

Figure 4:
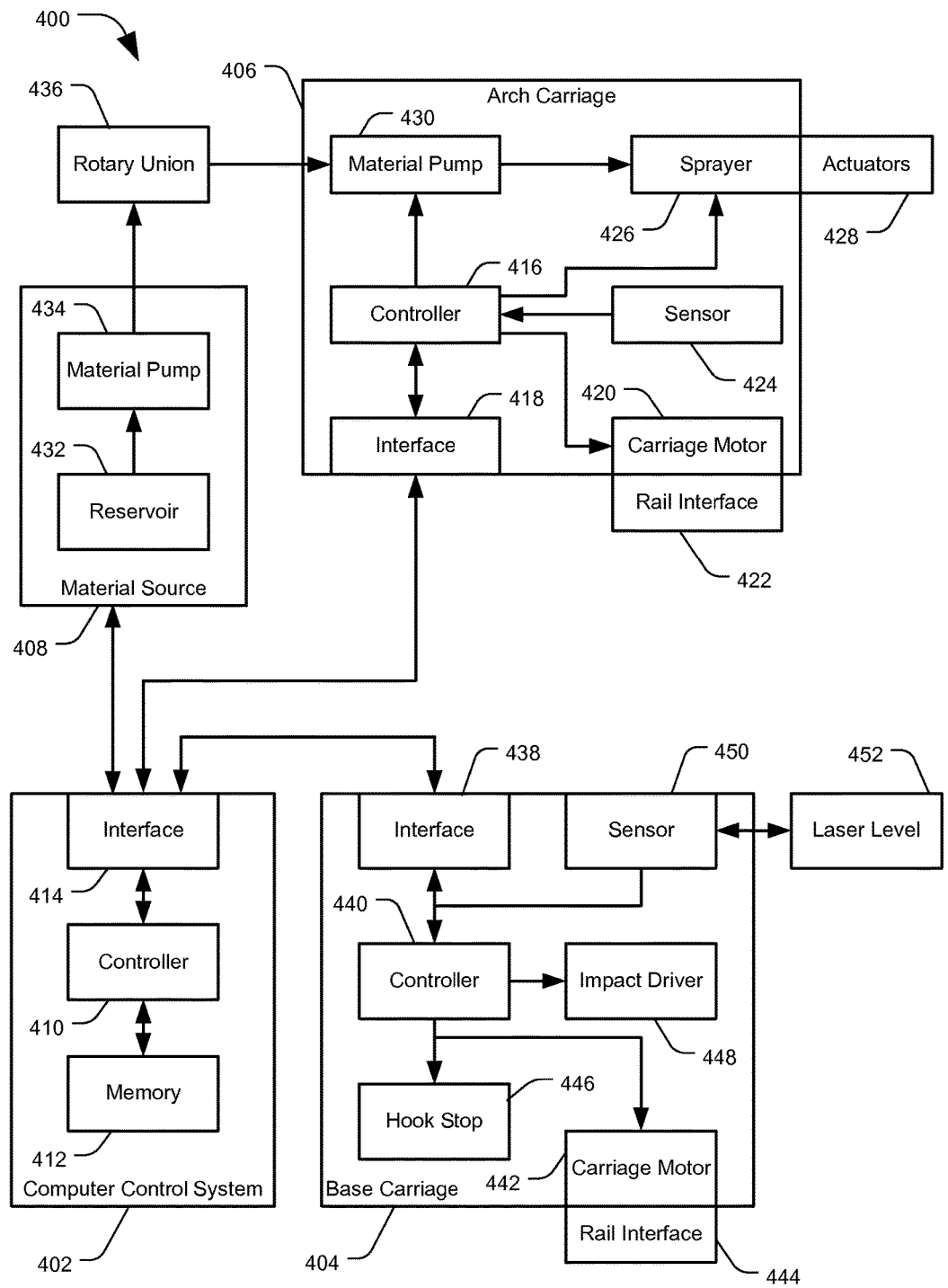
FIG. 4 is a block diagram of a system for spray printing construction, in accordance with certain embodiments of the present disclosure.

FIG. 4 depicts a block diagram of a system 400 for spray printing construction, in accordance with certain embodiments of the present disclosure. System 400 may include a computer control system (CCS) 402, a base carriage 404, an arch carriage 406, and a material source 408.

The CCS 402 may include one or more computer systems, circuits, processors, and software for controlling one or more operations of a spray printing construction system 400. The CCS 402 may include a computer numerical control (CNC) system for the automation of machine tools, operated by programmed commands encoded on a storage medium of a data storage device. In the example embodiment, the CCS 402 may include a controller 410, a memory 412, and an interface 414.

Controller 410 may include one or more controllers, processor circuits, application specific integrated circuits (ASIC), field programmable gate arrays (FPGAs), or other computer control systems for executing a set of programmed instructions. Memory 412 may be one or more volatile or nonvolatile data storage devices, such as hard disc drives, NAND flash memory, read-only memories (ROMs), or other memories. Memory 412 may store software in the form of specific instructions to be implemented by controller 410. Interface 414 may be one or more wired or wireless communication interfaces, such as wireless-fidelity (wi-fi), Bluetooth, ethernet, any other wired or wireless communication interface, or any combination thereof. The controller 410 may send data to and receive data from the other components of system 400 (e.g. to the components of base carriage 404 and arch carriage 406) via the interface 414.

The CCS 402 may execute operations, for example based on instructions stored to memory 412, to control the operations of system 400. For example, the CCS 402 may send instructions via interface 414 to one or more base carriages 404, directing the base carriages 404 to traverse a base track of a spray printing construction system. The base carriages 404 may support a truss or gantry structure, to which the one or more arch carriages 406 may be connected. By adjusting the position of the base carriages 404, the orientation of the truss and the arch carriages may be changed, and may allow the arch carriage to reach any necessary angle for printing a dome structure. Likewise, the CCS 402 may send instructions to the one or more arch carriages 406, to adjust a position of the arch carriages 406 along the truss. The CCS 402 may send instructions for controlling additional components or functionality of system 400 as well.

The CCS 402 may include a single computing device, or distributed computing elements. For example, the CCS 402 may include a desktop computer, laptop computer, or other computing device, which may store design specifications for a dome structure. The computer may connect via wired or wireless communication to a computerized control unit for the dome printing system 400, for example located locally to the spray printer components (e.g. base rail, arch system, printer apparatuses, etc.). The computer control unit may, based on the building design instructions and software for controlling the machinery, direct the spray printing system 400 to spray a dome structure according to the design instructions. In addition, computer circuits, controllers, processors, and other computerized elements may be located on the base carriages 404, arch carriages 406, or other elements of the system 400. Other embodiments are also possible.

The spray printing construction system 400 may include one or more arch carriages 406, which may be mounted to a truss system, such as an arched truss which may attach to base carriages 404 and may rotate on a circular base rail. The one or more arch carriages 406 may include a controller 416, an interface 418, a carriage motor 420 and associated rail interface 422, one or more sensors 424, one or more sprayers 426 and one or more associated actuators 428, and one or more material pumps 430.

Controller 416 may include one or more circuits, processors, or similar computerize control devices, and may locally control the components of arch carriage 406. The controller 416 may receive information and instructions from the CCS 402, and send information and sensor data to the CCS 402, via wired or wireless interface 418. For example, the controller 416 may receive instructions to adjust a position of the arch carriage 406 using the carriage motor 420, to adjust or operate the sprayers 426 or actuators 428, or to perform other control operations. Similarly, readings from the sensors 424 or other data may be returned to the CCS 402. In some embodiments, the CCS 402 may directly control the components of the arch carriage 406 without the need for a local controller 416.

The carriage motor 420 may be used to adjust a position of the arch carriage 406 along an arched truss system or similar truss system. For example, the arched truss may include one or more rails, to which the arch carriage 406 may attach via one or more rail interfaces 422. Rail interface 422 may include one or more wheels, gears, or other implements configured to grip the rails of the arched truss, allowing the arch carriage 406 to roll along the truss. In an example embodiment, the carriage motor 420 may adjust the position of the arch carriage 406 by using a drive belt attached to the truss, to pull the arch carriage 406 up or lower it down the rails using the drive belt. Example embodiments employing a drive belt or gearbelt will be address in greater detail with regards to FIGS. 8-10. In another embodiment, a chain, such as a roller chain, may be welded to one or more rails of the truss, and the carriage motor or rail interface 422 is configured to interface with and use the grooves or spaces of the chain to achieve traction for moving the arch carriage 406. In other embodiments, any other means for achieving traction and moving the arch carriage 406 may be employed, such as grooves, slots, holes, a sufficiently secure grip of the rail interface, other means, or any combination thereof.

Arch carriage 406 may also include one or more printer heads or sprayer assemblies 426, which may be capable of precise deposition of materials (such as setting materials, metals, polymers, or other materials). The position and orientation of the sprayer 426 may be adjusted, for example by using a motor to adjust an orientation of the sprayer 426 relative to the arch carriage, e.g. by rotating around an axis point by which the sprayer 426 is affixed to the carriage. The spray nozzle of the sprayer 426 may also be adjusted to be closer to or farther away from the target surface for the material, for example to allow for more precise pattern printing or for greater spray coverage. The positioning of the sprayer 426 may be adjusted by the controller 416 or by the CCS 402, for example.

The spray output from the sprayer 426 may also by adjusted by controlling volume and velocity of the sprayed material. For example, the volume and velocity of material spray may be adjusted by controlling the material pump 430 of the arch carriage 406 to increase or reduce the material flow. In some examples, the sprayer 426 may include an adjustable nozzle or aperture to adjust a volume and velocity of material spray.

In some embodiments, the dome spray system 400 may include a material source 408, such as a mixer for setting materials. The materials for the dome spray printer 400 may be mixed and pumped by the material source 408, which may be controlled by the CCS 402 to adjust the mixer and pump system demands. The materials may be pumped through a rotary union 436, which may be located at the top of a central support pillar or approximately at the apex of the arched truss, and which can allow the arch to rotate in a continuous 360 degrees without rotary limitations. The rotary union 436 may also provide conduits for electrical power, hydraulic fluid power, and control signaling (e.g. wired interface communications) without rotary limitations.

Material source 408 may include a material reservoir 432 and a material pump 434. In some embodiments, material source 408 will include a material pump 434 to supply material to the arch carriage 406, where a second material pump 430 can regulate material pressure and flow to a sprayer 426. In some embodiments, only a single material pump may be used, or more than two material pumps may be used. Other embodiments are also possible.

In some embodiment, the material pump 434 of the material source 408 may pump setting material or other materials to the arch carriage 406 by pumping the material up a central column or shaft, such as shaft 104 of FIG. 1. For example, hoses or tubing may be used to transport the material from the material source 408 to the arch carriages 406, and such hoses or tubing may be run through a hollow shaft or pillar to the top of the arch truss. In other embodiments, the material source 408 may be suspended over the dome printing machinery, for example using a crane, which may reduce the pressure and energy necessary to supply material to the arch carriages 406. The material may be passed through a rotary union 436 of the dome printing machinery. For example, a hose may be run from the material pump 434 of the material source 408 to an input of the rotary union, and another hose may be run from an output of the rotary union to the arch carriage 406. The rotary pump may allow the dome printing machinery (e.g. the arch truss) to rotate without tangling or kinking the material supply hoses.

Returning to the sprayer system 426 of the arch carriage 406, one or more actuators 428 or other mechanical components can be used in conjunction with the sprayer 426. In some embodiments, an ultrasonically vibrating nozzle or CNC end actuator 428 moving in concert with the material delivery mechanism may be used to create a free-floating material spray form to shape fast-setting materials. For example, materials can be atomized into a fine spray and precisely directed using the nozzle and computer-controlled end actuator to produce specific printed or sprayed patterns. In some examples, the end actuator 428 may include a plate, shield, cone, or other end component, which may be curved or otherwise shaped, and may be used to direct the flow of the spray. In some embodiments, the end actuator 428 may be used for direct surface smoothing by physically drawing the actuator across the surface of the applied materials. Accordingly, the sprayer 426 and end actuator 428 allow for printing of fine details, in specified patterns, or for surface smoothing.

In some embodiments, actuators 428 may include a spooling end actuator device to allow for precise placement or application of reinforcing materials to the printed dome structure. For example, reinforcing material may include basalt, glass, carbon, hemp, or other plastic or natural fibers in a variety of forms, such as rope, cord, roving, or monofilament. The spooling actuator may be included on or near to the sprayer assembly 426, and may lay the reinforcing threads through the structure as it gets printed. For example, hemp fibers or cords could be combined with geopolymers or ceramic cements in the forming of a structure. The printing and laying of reinforcement materials may be performed in a generally circular rotation pattern, or the sprayer 426 and spooling actuator 428 may be configured to move at different angles or in more complex patterns. Accordingly, the spooling actuator 428 may be used to apply reinforcing materials in grid patterns or at various angles. In some embodiments, a spooling actuator 428 may be used to lay electric wiring or other spoolable materials instead of or in addition to reinforcing materials.

In some embodiment, the sprayer 426 may include a microwave or other heating elements 428, which may be used to heat material for application, to control a rate of cooling and shrinkage of material, for other purposes, or any combination thereof. For example, the sprayer assembly 426 may include a thermal spraying end actuator 428 for applying heated or melted materials, such as metals or plastics, to a surface. The material, sometimes called "feedstock", may be heated by electrical, chemical, or other means into a state conducive to spray application. An example embodiment may include plasma spraying, a variety of thermal spraying, which may be used for the deposition of various metallic compounds onto the surface of the dome structure, such as for corrosion protection, electrical conductance, solar electro-magnetic shielding, radiation shielding, other structural components, or any combination thereof. For example, electrical conductance material may be printed within walls of the structure during the building fabrication process, and may be used in place of wiring for delivery of electricity through the structure. In some example embodiments, conductance material may be sprayed or run on the printed structure at a selected stage or pass of the dome printing process, and covered with setting material at a subsequence stage or pass. Solar energy receptive cells, for example sprayable solar coatings such as solar liquid power (SLP), may also be applied to the structure using the thermal spraying end actuator 428.

In some embodiments, the sprayer assembly 426 may include a pultrusion end actuator 428, which may be a pultrusion forming adaptor for the creation of fluid and wire grooves or chases within the structural elements of the printed structure. For example, the pultrusion actuator 428 may be used for creating a cavity or conduit in the structure, which may be used for wiring, fluids or plumbing, ventilation, or other purposes. In some embodiments, the metallic delivery actuator 428 may contemporaneously lay electrical conductance material within the conduit. Other end actuators, spoolers, smoothing or shaping tools, or other implements or accessories may also be included on or along with sprayer 426.

In some embodiments, sprayer apparatus 110 may also include lasers, masers (microwave amplification by stimulated emission of radiation), magnetic field generators such as electromagnets, or other elements to control the placement and curing of materials. For example, lasers and masers may be used for pulsed laser deposition (PLD), radiofrequency-assisted PLD (RF-PLD), matrix-assisted pulsed laser evaporation (MAPLE), other techniques, or any combination thereof. Techniques such as PLD may be used for applying thin film coatings of materials such as ferroelectrics, superconductors, oxides, polymers, complex hybrid metal-organics, other materials, or any combination thereof. Masers may be used to influence the shape of the matrix within materials, which can influence strength and other characteristics. Lasers and masers may be used to control a rate of cooling of deposited materials, which can contribute to stronger bonds and control cracking Magnetic fields may be used to control the deposition of metallic particles for position and shape. Other uses and embodiments are also possible.

Additional actuators 428 and attachments may also be included, such as engraving tools and polishing tools. In some embodiments, actuators and other attachments 428 may be selectively connected to or removed from arch carriage 406, such as based on the specified designs of a structure, the current point in the fabrication process, other considerations, or any combination thereof. For example, actuators 428 which assist in a spraying process may be connected when setting materials are being applied, and a polishing tool may be connected after the basic structure has set in order to smooth surfaces. Other embodiments are also possible.

The arch carriage 406 may also include one or more sensors 424, such as sonar or laser sensors, which may be used to determine a position and distance of a print surface (e.g. such as an inflatable base form 112 as depicted in FIG. 1), as well as a thickness of material printed onto the surface to ensure proper material thickness and distribution. For example, ultrasonic emitters or transducers and ultrasonic thickness gauges may be used to perform ultrasonic thickness measurement (UTM) by measuring an amount of time for an ultrasonic wave to pass through the material and reflect back to a sensor. One or more cameras may also be included with sensors 424, which may record or transmit images, for example to a control panel for an operator to view. In some embodiments, a control panel including a visual interface may be provided as part of the CCS 402. In some embodiments, the sensors 424 may be included on or proximate to the sprayers 426.

For example, sensors 424 may determine a distance between the sprayer 426 and the spraying surface. The distance information may be communicated to the controller 416 of the arch carriage 406, or to the CCS 402. The controller 416 or CCS 402 may use the distance information to adjust a position of the sprayer 426, e.g. using a motor connected to the sprayer 426, to move the sprayer closer or farther from the spraying surface to obtain a desired distance for material distribution. In some embodiments, a distance sensor 424 may detect contours of a sprayable surface, such as a protruding segment of an inflatable base form that may indicate a position for a door, window, or other opening in the structure. The controller 416 or CCS 402 may detect the protrusion and cease spraying operations when the dome spray printer is passing over the protrusion. Similarly, sensors may detect a thickness of the sprayed material, which may be used to determine an amount of additional material to spray to meet a selected or designated thickness. Other embodiments and other sensors are also possible.

These combined elements (e.g. sprayer or printer head assembly 426, actuator devices 428, and sensors 424) can allow for the defined placement of materials to create window and door features or other features. As discussed, an inflatable base form may have defined inflatable features that the printer head can sense and coat as defined in the pre-programming to fulfill engineered specifications. For example, the printing system may be configured to sense a shape of the base form, and not spray or coat protrusions of a given size on a base form, allowing for the formation of features of the dome. In another embodiment, the vibrating CNC actuator may be used to adjust the printer spray to form desired shapes without a need for specifically designed base forms, or without the need for any base form at all.

The arch carriages 406 for the printer head or sprayer assemblies 426, or in some embodiments, separate or additional carriages, may include a variety of additional devices and elements for applying materials, modifying the properties of the printer head spray, or for other functions.

Spray printing construction system 400 may include one or more base carriages 404. Base carriages 404 may include motorized carriages which may attach to and travel along a base rail system. The base carriages 404 may support a truss system, such as an arched truss system to which arch carriages 406 may attach. The base carriages 404 may include an interface 438, a controller 440, a carriage motor 442 and associated rail interface 444, a hook stop 446, an impact driver 448, and one or more sensors 450.

Similar to controller 416 of the arch carriage 406, the controller 440 of the base carriage 404 may include one or more circuits, processors, or similar computerize control devices, and may locally control the components of base carriage 404. The controller 440 may receive information and instructions from the CCS 402, and send information and sensor data to the CCS 402, via wired or wireless interface 438. For example, the controller 440 may receive instructions from the CCS 402 to adjust a position of the base carriage 406 on a base rail using the carriage motor 442, to operate the hook stop 446 or impact driver 448, or to perform other control operations. Similarly, readings from the sensors 450 or other data may be returned to the CCS 402. In some embodiments, the CCS 402 may directly control the components of the arch carriage 404 without the need for a local controller 440.

Base carriage 404 may include a rail interface, such as one or more wheels, gears, or other implements for joining the base carriage 404 to a base rail system. The base carriage 404 may also include a carriage motor 442, for causing the base carriage 404 to move along the base rail. For example, the carriage motor 442 may cause wheels of the rail interface 444 to rotate, which may move the base carriage 404 along the rail. In some embodiments, the carriage motor 442 or rail interface 444 may grip or interface with a roller chain, drive belt, or other features of the base rail or dome printing system to facilitate movement of the base carriage 404.

For example, movement of a rotating truss or gantry may be facilitated by the use of base carriages 404 in the form of small carts (e.g. 30" square). The rail interface 444 may include rail-capturing wheels (such as may be found on a roller coaster carriage) which may be powered by carriage motor 442, for example, a cordless drill motor or other motor attached to one wheel and which can be started and stopped by a small on-board programmable controller or processor circuit 440. In some embodiments, the base carriage 404 may be controlled by other means, such as remotely by an off-board controller 410 of CCS 402.

Functionality of the base carriage 404 may include a system for self-leveling a base track on which the base carriage 404 may operate. The self-leveling process may be performed using the base carriages which support the arched truss, or separate carriages specially configured for rail leveling. In some embodiments, the base track may be designed as a modular system providing for a high degree of transportability and for ease of assembly. For example, the base rail may consist of a plurality of rail sections which may be disassembled and moved on a truck, and then connected on-site for dome printing. The ground at a work site may be uneven or irregular, which could cause the dome printing system to become imbalanced or perform sub optimally if the base rail was not leveled.

The base carriage 404 may feature an electronic self-leveling system comprised of accelerometers, indexing magnetic proximity sensors, a system feedback locator device, an electronically-controlled jacking device, other components, or any combination thereof. The system may allow for a base track or rail to be leveled in a matter of minutes, automatically, even for an entire large-format track (e.g. in excess of 10 meters). For example, accelerometers, magnetic sensors, system feedback locator devices, or other components may be used to track a base carriage's 404 progress or location around the base track, such as by sensing or detecting cross-braces or supports on the base track. The jacking device, which may include a gear box and motor, may adjust the height of supports for the base track to coordinate a baseline level, so that the entire base track is approximately horizontally level. In some embodiments, the leveling process may be performed prior to erecting an inflatable dome form, prior to erecting the arched truss, or at another early point in the dome printing process. The automated self-leveling X-axis circular base rail system is discussed in further detail below.

In some embodiments, the self-leveling system may include a retractable hook-shaped stop 446, which may be actuated by an electric solenoid or other motor, and may be mounted or extend below the base carriage 404. The hook stop 446 may be operated by a programmable controller or processor circuit 440. The hook stop 446 may be in the down position while the base carriage 404 is in motion, and can catch on cross members spanning between the rails of the base track. A sensor (such as sensor 450) can detect the cross members, for example by using infrared detection, magnetic sensors, a force-feedback sensor on the hook stop 440, other sensors, or any combination thereof. The sensor 450 can notify the controller 440 to stop the power feed to the carriage motor 442 in order to stop the base carriage 404, and to begin the next function.

An impact driver 448 may be mounted to the base carriage 404, and actuate through a hole in the carriage. The impact driver 448 may be attached to a vertical slide mechanism actuated by an electric solenoid, which may also be operated by the programmable controller 440. In some embodiments, the impact driver 448 may include a socket, such as a conical-faced socket, that can self-align onto jack bolt heads located on the backside of the cross members. After the controller 440 determines that a base carriage 404 has "hooked" a cross member, it may stop the carriage motor 442, actuate the impact driver 448 down until connected to the jacking bolt, and gather input from a laser receiver (e.g. sensor 450).

A rotating laser receiver sensor 450 may be mounted on top of the base carriage 404, e.g. on a tripod near the center of the cart, and may be used during the process of leveling the rails. The laser receiver sensor 450 may communicate with the programmable controller 440 by wired or wireless communication. In some embodiments, a rotating laser level 452 may be set up, such as at the center of the circular base track, to communicate with the receiver sensor 450 on the base carriage 404. For example, the laser level 452 may be an apparatus which can be set up on the ground (e.g. using a tripod), and can transmit a laser substantially horizontally. In some embodiments, the laser level 452 may transmit the laser in a 360 degree circle, either continuously or by rotating. The transmitted laser may be detected by sensor 450 to determine whether sensor 450 is currently below, above, or equal in height with the laser level 452. This data may be used to adjust a height of the base rail so that the rail is approximately level for the entire circumference.

The laser receiver sensor 450 can sense whether the rails are too low, too high, or the correct height (e.g. based on the laser level readings) and may send a signal to the controller 440 based on the detected height. The controller 440 may then send a forward or reverse instruction to the impact driver 448, which may cause the impact driver 448 to raise or lower the cross members, and therefore the base rail, using the jack bolts until the height of the rail is within a designated height range or threshold. When the height of the rail is correct (e.g. within an acceptable range or tolerance of being level based on the rotating laser level 452 signal), the controller 440 can raise the impact driver 448, raise the hook stop 440, and move the base carriage 404 to the next cross member using the carriage motor 442 (e.g. by lowering the hook stop 446 again after passing the current cross member so as to catch the next cross member).

In some examples, the first lap around the rail may be a roughing-cycle (e.g. designed to bring the track to within a first, rough threshold of being level) and level the rail to a rough (e.g. ¼") accuracy. In some embodiments, the controller 440 can maintain a count of measured cross-members or adjustment point segments to make sure all cross members have been measured (e.g. there may be twenty four cross members around the circumference of the base rail, and the controller 440 may count to twenty four for a first lap), then begin a final cycle with a finer (e.g. 3/32") accuracy. After reaching a threshold count, (for example after forty-eight cross members), the controller 440 may reset the count and sound a buzzer to alert an operator that the leveling process has completed. Additional or fewer cycles may be performed.

Figure 5:
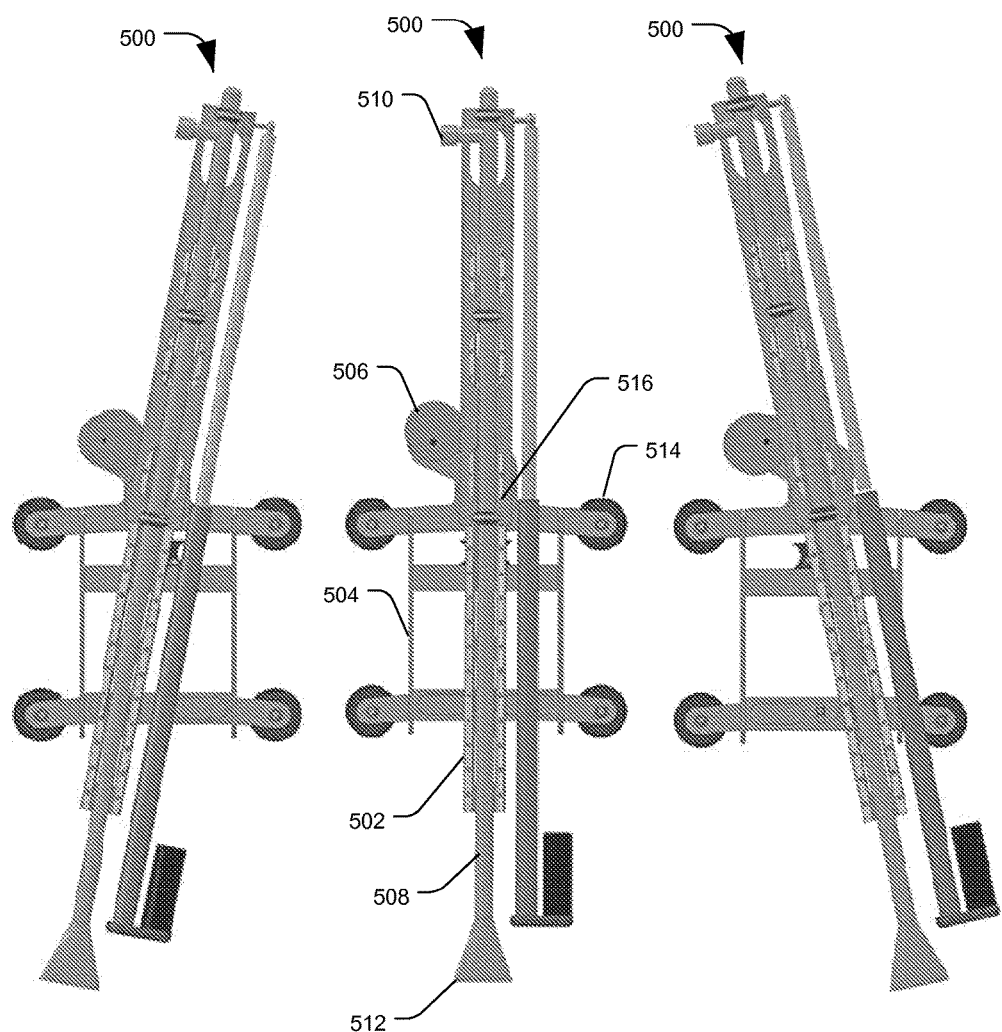
FIG. 5 is a diagram of a system for spray printing construction, in accordance with certain embodiments of the present disclosure.

Components of the spray printing construction system 400 will be illustrated in greater detail in the following figures. Turning to FIG. 5, a system for spray printing construction is shown in accordance with certain embodiments of the present disclosure. In particular, FIG. 5 depicts an arch carriage, sometimes called a Y-axis carriage, and associated spray head, collectively referred to as sprayer apparatus 500. Sprayer apparatus 500 may correspond to arch carriages 406 of FIG. 4 and sprayer apparatuses 110 of FIGS. 1-3.

In FIG. 5, three embodiments of sprayer apparatus 500 are depicted, illustrating the ability of an oscillating arm 502 of the sprayer assembly or print head to rotate relative to the arch carriage 504. For example, the oscillating arm 502 may be configured to rotate around example pivot or rotation point 516. In some embodiments, sprayer apparatus 500 may include one or more motors 506 which can be controlled remotely by manual or automated computer control to adjust the rotation of the sprayer assembly arm 502 relative to the arch carriage 504. An adjustable oscillation actuator may be allow for implementing different spray patterns. A spray end of oscillating arm 502 may be stabilized to prevent side deflection or other spray irregularities. In some embodiments, motors 506 may be used to adjust a Z-axis position of a portion of the oscillating arm 502, for example by adjusting the distance of a spray aperture relative to a target surface. For example, sprayer tube or nozzle 508 may be configured to slide forward or backward on guide rails of oscillating arm 502. In some embodiments, a linear motor may adjust a Z axis nozzle distance from the dome surface. In some embodiments, motors 506 may also be used to move the sprayer apparatus 500 along rail truss assembly.

Sprayer apparatus 500 may also include one or more material inputs 510, which may receive material (such as setting material, heated or melted materials, or other material feeds), electricity, or other inputs for spraying or operation of the sprayer apparatus 500. Sprayer apparatus 500 may also include one or more end actuators or elements 512, for directing or forming the spray pattern, or for performing other functions. For example, end element 512 may correspond to actuators 428 described in regards to FIG. 4. In addition, sprayer assembly 502 or arch carriage 504 may include one or more sensors for detecting a distance of a target surface, a thickness of sprayed material, or other metrics. For example, dual ultrasonic sensors can provide information on distance and depth of material being applied. In some embodiments, an electronic precision measuring scale for Z axis control can provide feedback to an onboard or remote computer for closed loop control of the sprayer apparatus 500. Sensors may also include one or more cameras, such as wireless cameras for operator viewing from a remote control console.

The sensors may also allow for eccentricity adjustments by the sprayer apparatus 500, such as to compensate for irregular distances between the arch and target surface. For example, the system may be configured to adjust for irregularities in the arch due to damage during transportation or other factors. The feedback loop can correct for and adjust head positioning to correctly form the dome building even if the mechanism has shape irregularities.

Arch carriage 504 may include one or more rail interfaces, such as rail capturing wheels 510. Arch carriage 504 may include quick disconnect latches to allow the sprayer apparatus 500 to be removed from the rails simply and quickly. In some embodiments, cannon plugs and quick pin construction may allow for quick disconnect and removal of oscillating arm 502 from the arch carriage 504.

Turning to FIG. 6, a system for spray printing construction is shown in accordance with certain embodiments of the present disclosure. In particular, FIG. 6 depicts another view of an arch carriage and associated spray head, collectively referred to as sprayer apparatus 600. Sprayer apparatus 600 may correspond to sprayer apparatus 500 of FIG. 5.

Sprayer apparatus 600 may include a sprayer arm 602, which may be oscillated or repositioned by motor 604. In some embodiments, sprayer arm 602 may also adjust a z-axis or distance position, for example by using arm rails 610. The sprayer apparatus 600 may interface with an arched truss or rail system 608 using a system of wheels 606.

In some embodiments, the arched truss or rail system 608 may comprise multiple curved rails joined by cross-braces. In the depicted embodiment of FIG. 6, the arch may comprise three curved rails with triangulated cross bracing, providing significant structural strength. The arch may be assembled from a plurality of arch sections, each including the plurality of rails with cross bracing. For example, the arch may be a 180-degree arc, which may be broken down into four approximately 45-degree arch sections. The sections may be bolted together by bulkhead plates, and joined at the top to a pivot section, as a cap for a central pole or support. In some embodiments, the center pole joins to the top pivot section and hydraulically telescopes to share the arch load and to assure precision height of the arch. Power cables and material may be run through the arch frame 608, preventing damage and freeing a working area of the arch dome printer of clutter.

FIG. 7 depicts another view of an example arch carriage and associated spray head, collectively referred to as sprayer apparatus 700. Sprayer apparatus 700 may correspond to sprayer apparatus 600 of FIG. 6. FIG. 7 depicts another view of the triangular arched truss system 704, and of a system of rail-interfacing wheels 706 of the sprayer apparatus 700 according to example embodiments. For example, the system of rail-interfacing wheels 706 may include a plurality of wheels to interface with the plurality of rails of the truss system 704, each having parallel axes of rotation, and at least one additional wheel to interface with at least one rail of the truss 704 having an axis of rotation perpendicular to the plurality of wheels. Wheels interfacing with the rails from different angles may provide additional stability or a stronger grip on the rail truss 704.

Figure 9:
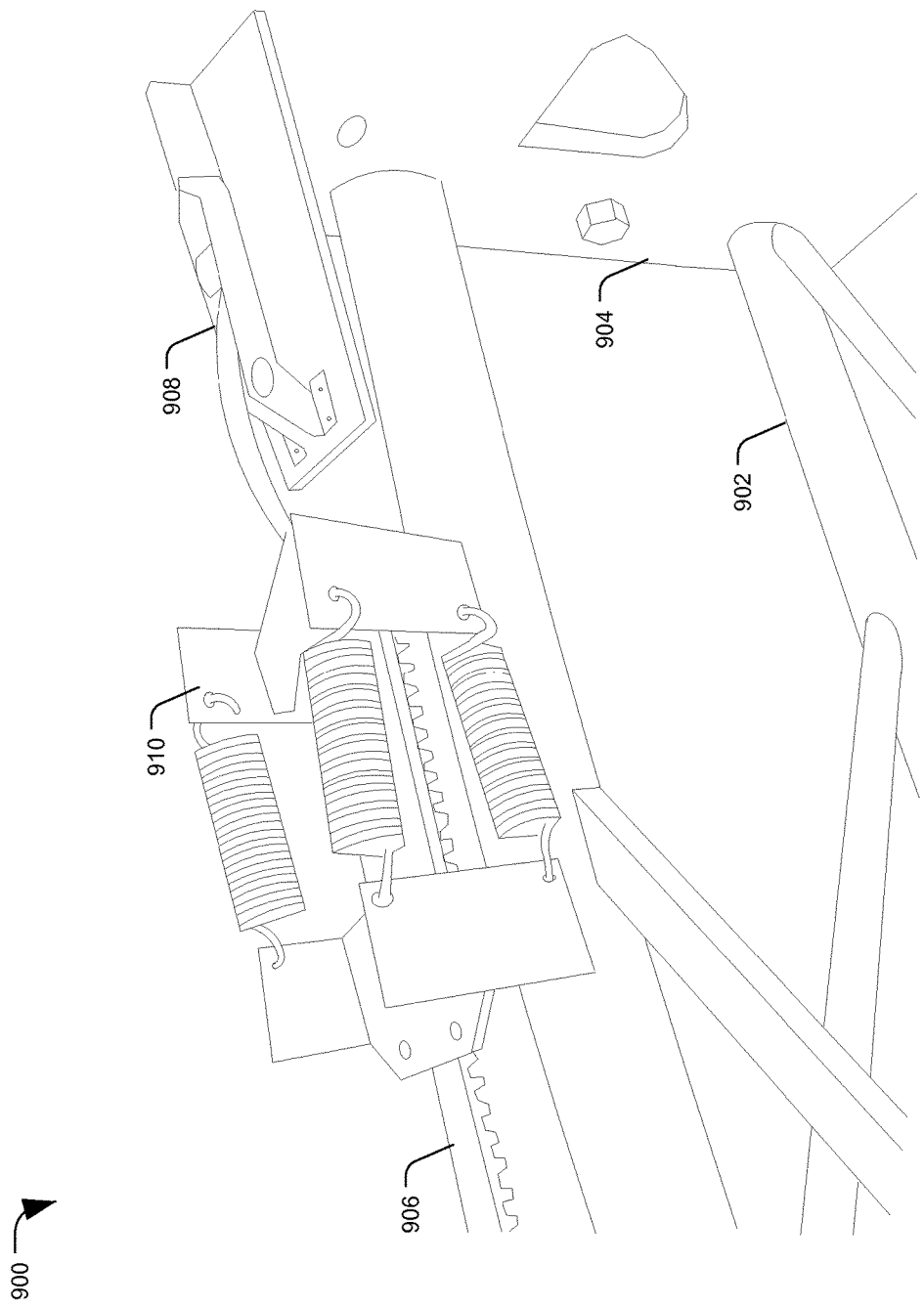
FIG. 9 is a diagram of a system for spray printing construction, in accordance with certain embodiments of the present disclosure.
Figure 10:
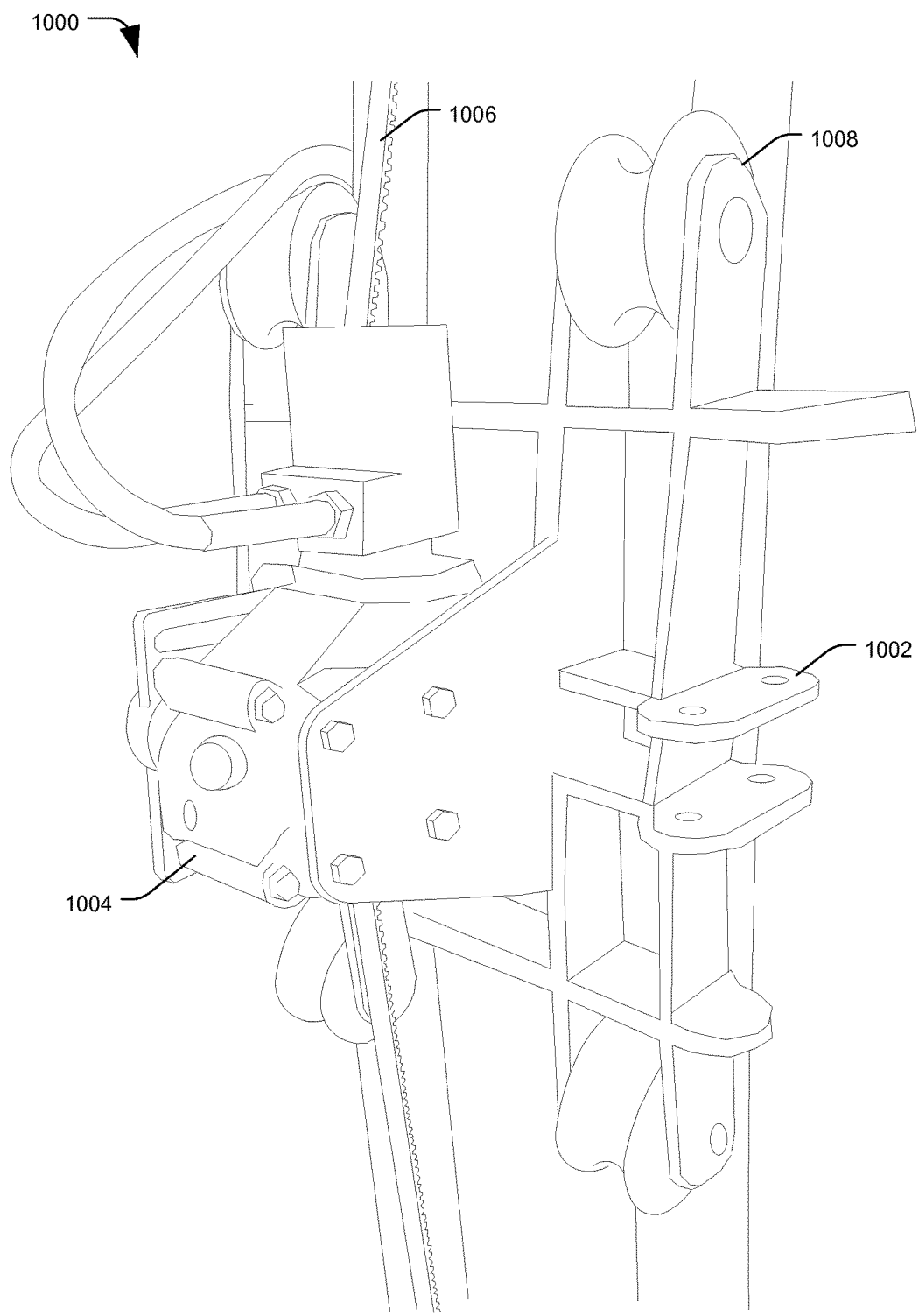
FIG. 10 is a diagram of a system for spray printing construction, in accordance with certain embodiments of the present disclosure.

Apparatus 700 may include a motor 702 which may be used to move the sprayer apparatus 700 along arched truss 704. For example, the motor 702 may use a drive or gear belt or chain to adjust a position of the carriage for the sprayer apparatus 700. An example embodiment of the dome printing system including a drive belt for arch carriage movement is depicted in FIGS. 8-10.

Figure 8:
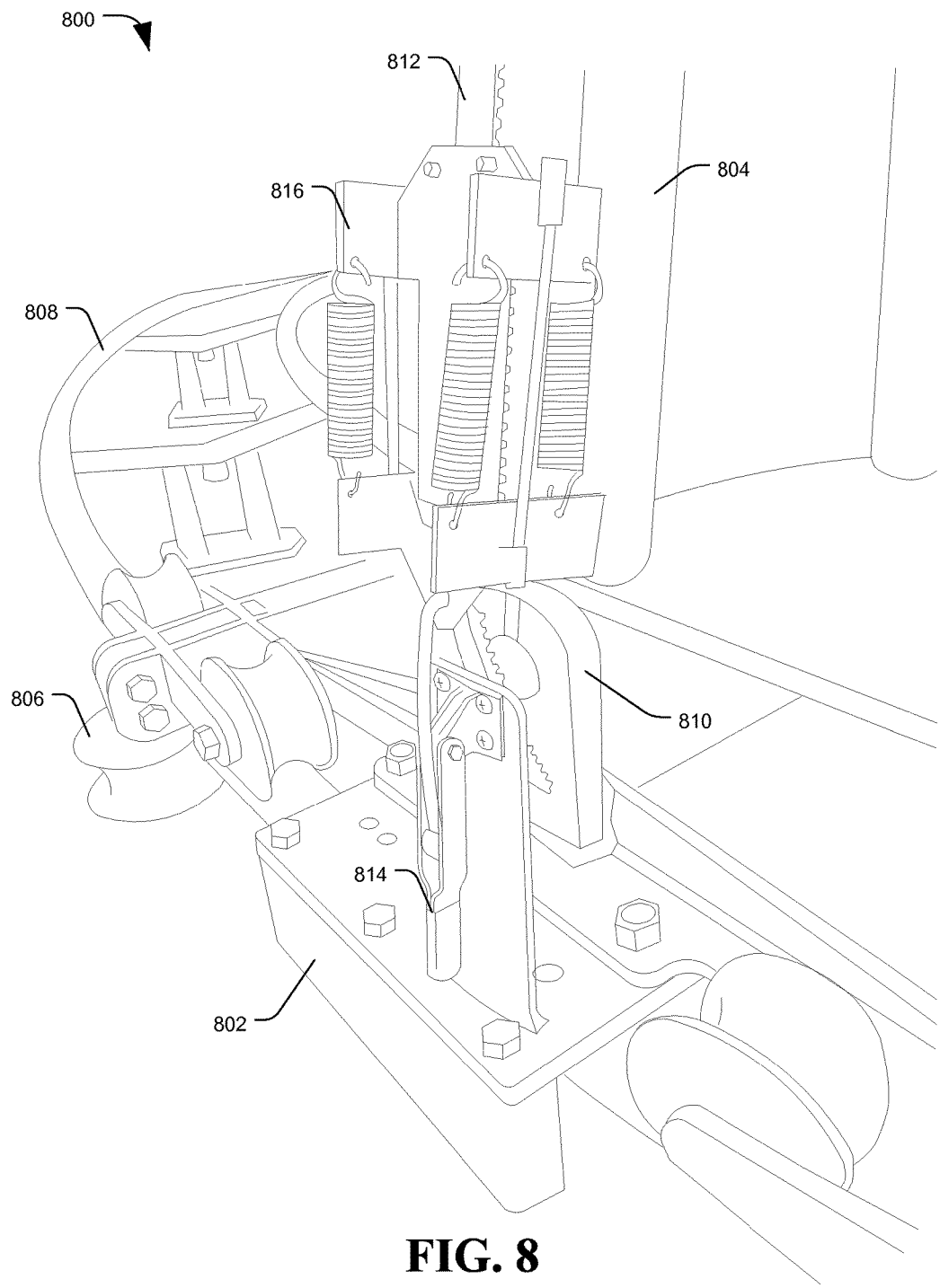
FIG. 8 is a diagram of a system for spray printing construction, in accordance with certain embodiments of the present disclosure.

FIG. 8 depicts a system 800 for spray printing construction, in accordance with certain embodiments of the present disclosure. In particular, FIG. 8 depicts a view of an example base carriage 802 and the base of the bridge truss 804 supported by the base carriage 802. Base carriage 802 may correspond to base carriage 108 of FIGS. 1-3. FIG. 8 depicts an example rail interface 806 for the base carriage 802, including a plurality of wheels to interface with the base rail 808 from different angles.

Bridge truss 804, such as an arched truss or gantry system, may join the base carriage 802 at hinge or joint 810. For example, the truss 804 and base carriage 802 may be separate components which can be joined together on site for quick assembly. A hinge component of the arch truss 804 (e.g. while the truss is laying approximately horizontally near the ground) may be fitted into a hinge component of the base carriage 802, and a pin may be fitted through the joined hinge components to secure the truss 804 and the base carriage 802 together. Once the arch truss 804 has been joined with base carriages 802 on both ends of the arch, the arch truss 804 may then be raised into a vertical operating position and locked into place.

System 800 also depicts an example embodiment of a gearbelt or drive belt system which may be used by an arch carriage to move along the arch truss. The gearbelt system may include a gearbelt 812, which may provide protrusions or other purchase for a motor to grip and use to raise or lower the arch carriage. In some embodiments, the gearbelt 812 may comprise a roller chain, rope, notches or groves on the arch truss 804 rails, some other component, or any combination thereof. In some embodiments, the gearbelt 812 may be secured in place with a clamping lever or mechanism 814, which may also include a spring loaded tensioner 816. The clamp 814 and tensioner 816 may minimize movement of the gearbelt 812 during operation of the dome spray printer, while allowing for quick release for on-site assembly and disassembly.

FIG. 9 depicts a system 900 for spray printing construction, in accordance with certain embodiments of the present disclosure. In particular, FIG. 9 depicts a view near the apex of an arch truss system 902. For example, plate 904 may connect a first half of the arch truss 902 to a second half of the arch truss, or may join a half of the arch truss 902 to a central pivot point, a socket for a central mast, or similar elements near the top of the arch.

As with FIG. 8, FIG. 9 depicts an example embodiment including a gearbelt system for use by arch carriages. For example, the gearbelt system may include a gearbelt 906, a clamp 908 such as a quick-release lever clamp, and a spring tensioner 910. The claim 908 may secure the opposite end of gearbelt 906 from the clamp 814 of FIG. 8.

Turning now to FIG. 10, a system 1000 for spray printing construction is shown in accordance with certain embodiments of the present disclosure. FIG. 10 depicts a view of an example arch carriage 1002 including a motor 1004. In some embodiments, a gearbelt 1006 may feed through the motor 1004. The motor 1004 may grip the gearbelt 1006 in order to obtain the traction necessary to pull the arch carriage 1002 up the arch truss and lower the arch carriage 1002 down the arch truss. The motor 1004 and gearbelt 1006 system can enable the arch carriage 1002 to ascend over the arch truss, for example in response to computer control signals. The arch carriage 1002 may include a self-activated emergency brake system in case of gearbelt 1006 failure. For example, the arch carriage 1002 may include an accelerometer to detect an unexpected acceleration, sensors on the wheels of the rail interface 1008 to detect unexpected wheel movement, or another system to detect gearbelt 1006 failure. The rail interface 1008 may include a self-activating break system in case gearbelt failure 1006 is detected.

Figure 11:
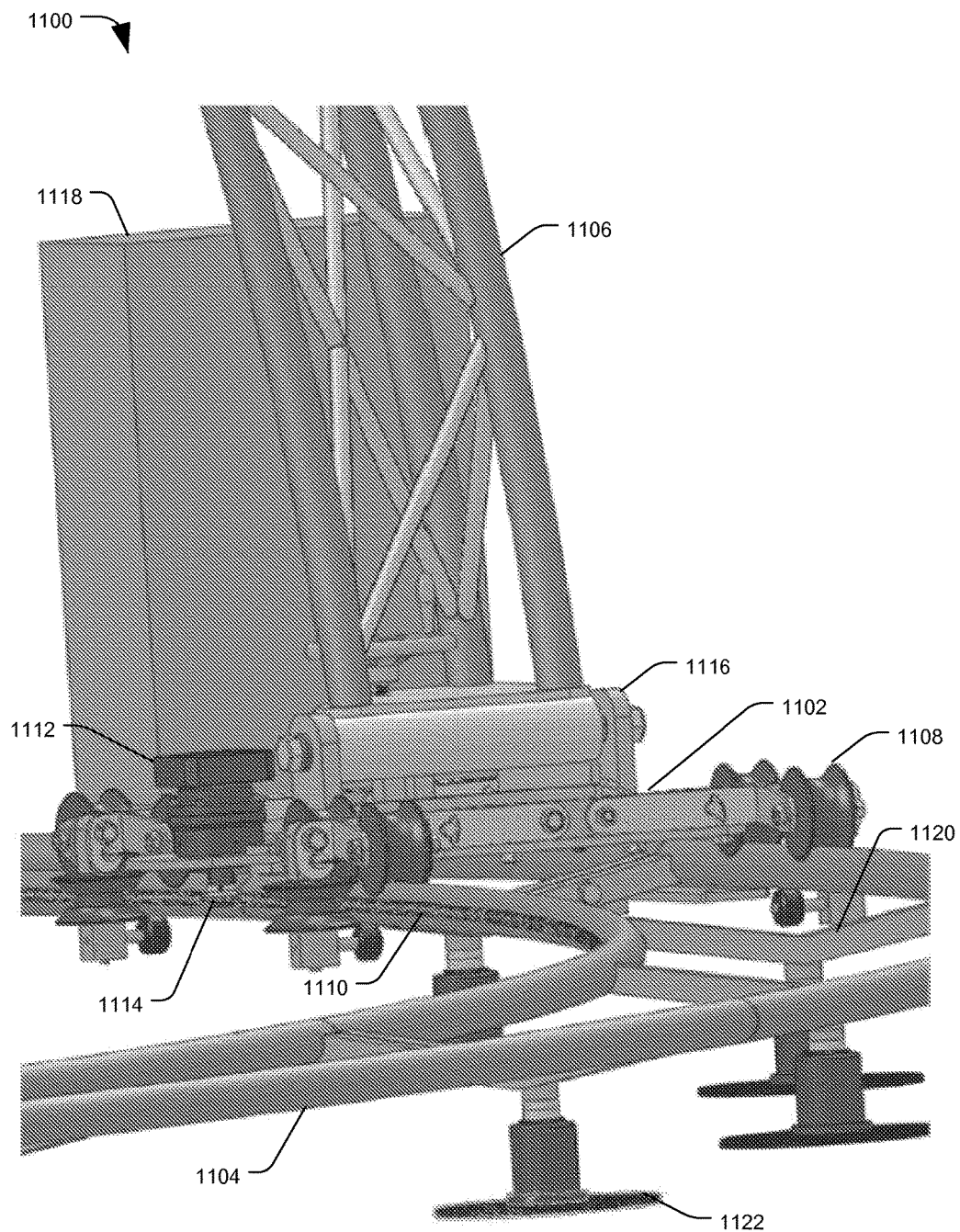
FIG. 11 is a diagram of a system for spray printing construction, in accordance with certain embodiments of the present disclosure.

Turning now to FIG. 11, a system 1100 for spray printing construction is shown in accordance with certain embodiments of the present disclosure. In particular, system 1100 may include an example embodiment of a base carriage 1102, or "X axis carriage", configured to move along base rail 1104. In some example embodiments, one or more base carriages 1102 may include an electrical control box 1118, which may include circuitry and processors, quick plug-in control cable mounts, other electrical elements, or any combination thereof.

Spray printing construction system 1100 may include two base carriages 1102 located on opposite sides of a circular base rail 1104. Each base carriage 1102 may be configured for synchronized movement around the base rail 1104 (e.g. based on instructions from a computer control system), and to support opposite ends of a bridge truss or arch truss 1106 that spans the diameter of the base rail 1104. The base carriages 1102 and arch truss 1106 may be designed with arch lifting pivots or hinges 1116, which may allow an arch to be quickly secured arch after being lifted into position.

The base carriage 1102 may interface with the base rail 1104 using a rail interface 1108, which in some embodiments may include a plurality of wheel elements. The rail interface 1108 may include multiple wheels may ensure smooth movement and even weight distribution of the base carriage 1102. In some embodiments, the wheels of rail interface 1108 may interface with the base rail 1104 from multiple angles, such as from the top of the rail and side of the rail in an "L" configuration. In some embodiments, safety wheels may maintain wheel contact with rails while "L" frames give second line of safety.

The base carriage 1102 may include a motor 1112, which may be computer-controlled to drive the base carriage 1102, for example in a synchronous pattern with a second base carriage. In some embodiments, the motor 1112 may include a gear or "pinion" 1114 to interface with a "rack" 1110, gear bar, roller chain, or other feature of the base rail 1104 configured to provide purchase to the motor 1102 for driving the base carriage 1102. For example, a gear rack 1110 may be welded to the inner rail, outer rail, or both of base rail 1104. In some embodiments, the synchronized motor-driven base carriages 1102 may continually monitor a position of the arch truss 1106 via the rack and pinion system.

The base rail 1104 may include a set of concentric curved dual rails. In some embodiments, more or fewer rails may be used. The base rail 1104 may be divided into a plurality of sections of the dual rails, for ease of transportation and assembly of the dome printing system 1100. In an example embodiment, the base rail 1104 may include eight sections of curved dual rails, with the dual rails approximately 24" apart. The dual rails may be mounted on slightly "V'd" cross braces 1120, which may be supports for leveling feet 1122. Cross braces 1120 at the ends of each section of base rail 1104 may bolt into the next section. For an example base rail 1104 with an approximately 120' circumference, cross braces 1120 may be located approximately every 5' for a total of 24 leveling feet 1122 around the circumference. In some embodiments, the leveling feet 1122 may include vertical screw scissor jacks that pin into cross braces 1120. The vertical screw scissor jacks may allow for an auto or self-leveling feature as described in regards to FIG. 4.

Figure 12:
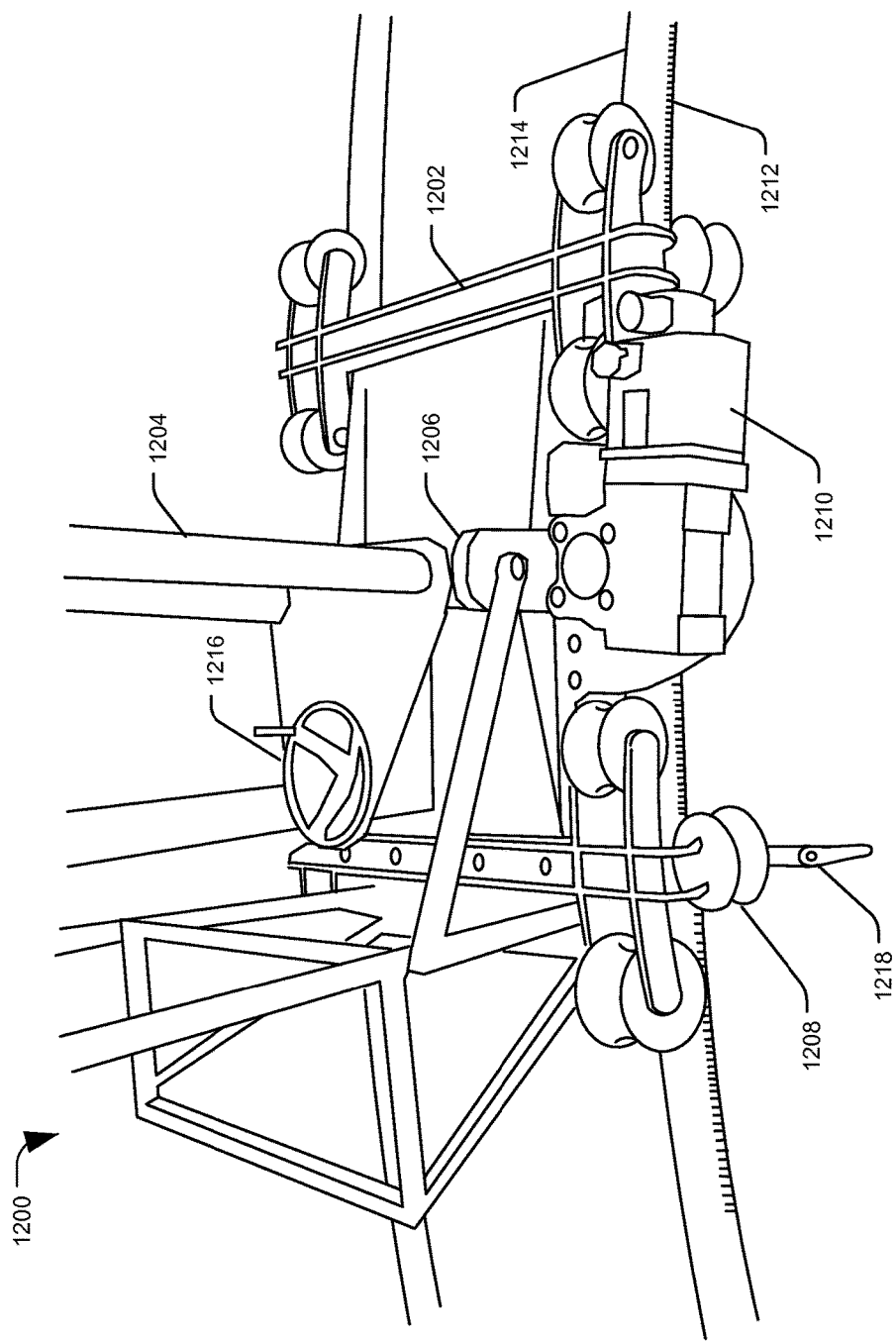
FIG. 12 is a diagram of a system for spray printing construction, in accordance with certain embodiments of the present disclosure.

FIG. 12 depicts a system 1200 for spray printing construction, in accordance with certain embodiments of the present disclosure. In particular, FIG. 12 depicts a view of an example base carriage 1202. A bridge truss 1204 may join with base carriage 1202 at a hinge or pivot 1206. Base carriage 1202 may include a rail interface 1208, which may comprise a plurality of wheels to ride on and securely grasp base rails 1214. In some embodiments, the rail interface 1208 may include automated or manual brake elements to prevent the base carriage from moving 1218.

A motor 1210, such as a servo motor and gearbox, may drive the base carriage 1202, for example using a gear rack 1212 mounted to base rail 1214. In some embodiments, the base carriage 1202 may include a lockdown mechanism 1216 element, which may be used to secure the bridge truss 1204 to the base carriage 1202.

Figure 13:
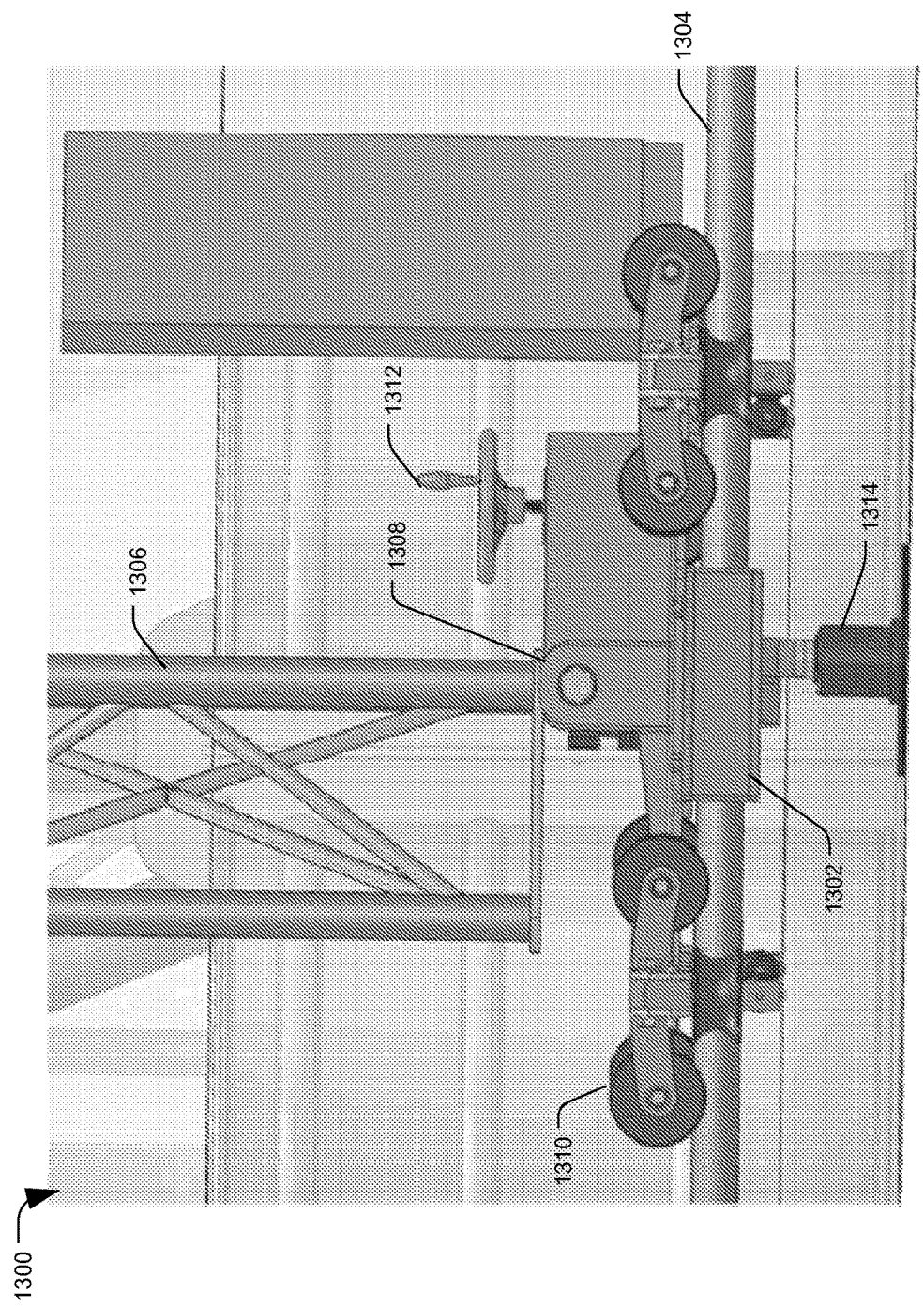
FIG. 13 is a diagram of a system for spray printing construction, in accordance with certain embodiments of the present disclosure.

FIG. 13 depicts a system 1300 for spray printing construction, in accordance with certain embodiments of the present disclosure. In particular, FIG. 13 depicts another view of an example base carriage 1302 and base rail 1304. A bridge truss 1306 may join with base carriage 1302 at a hinge or pivot 1308. Base carriage 1302 may include a rail interface 1310, which may comprise a plurality of wheels to ride on and securely grasp base rails 1304. The base carriage 1302 may also include a lockdown mechanism 1312. The lockdown mechanism 1312 may be used to secure the bridge truss 1306 to the base carriage 1302.

Figure 14:
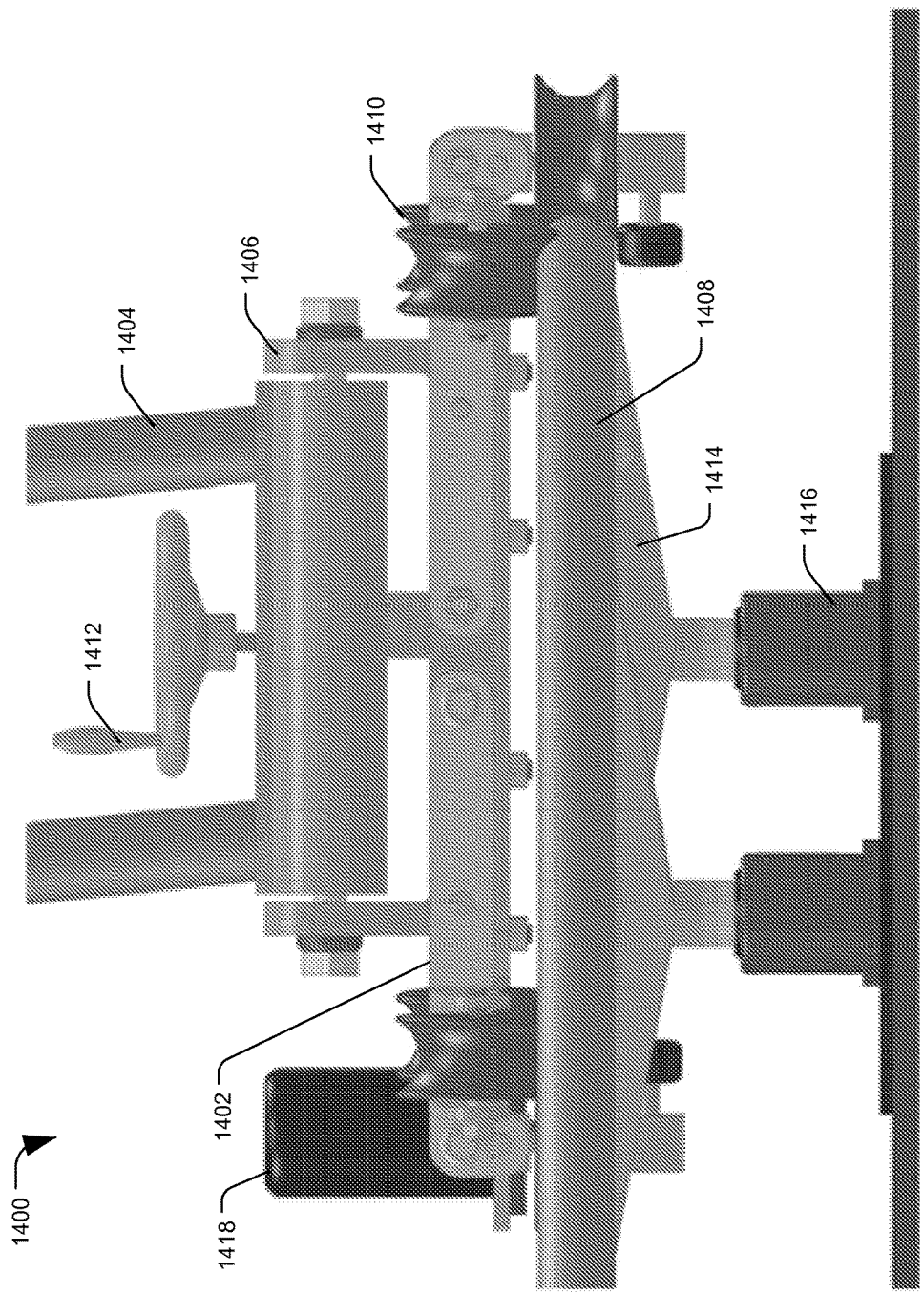
FIG. 14 is a diagram of a system for spray printing construction, in accordance with certain embodiments of the present disclosure.

FIG. 14 depicts a system 1400 for spray printing construction, in accordance with certain embodiments of the present disclosure. In particular, FIG. 14 depicts another view of an example base carriage 1402. A bridge truss 1404 may join with base carriage 1402 at a hinge or pivot 1406. Base carriage 1402 may include a rail interface 1410, which may comprise a plurality of wheels to ride on and securely grasp base rails 1408. The base carriage 1402 may also include a motor 1418 to drive the base carriage 1402. A lockdown mechanism 1412 may be used to secure the bridge truss 1404 to the base carriage 1402.

Figure 15:
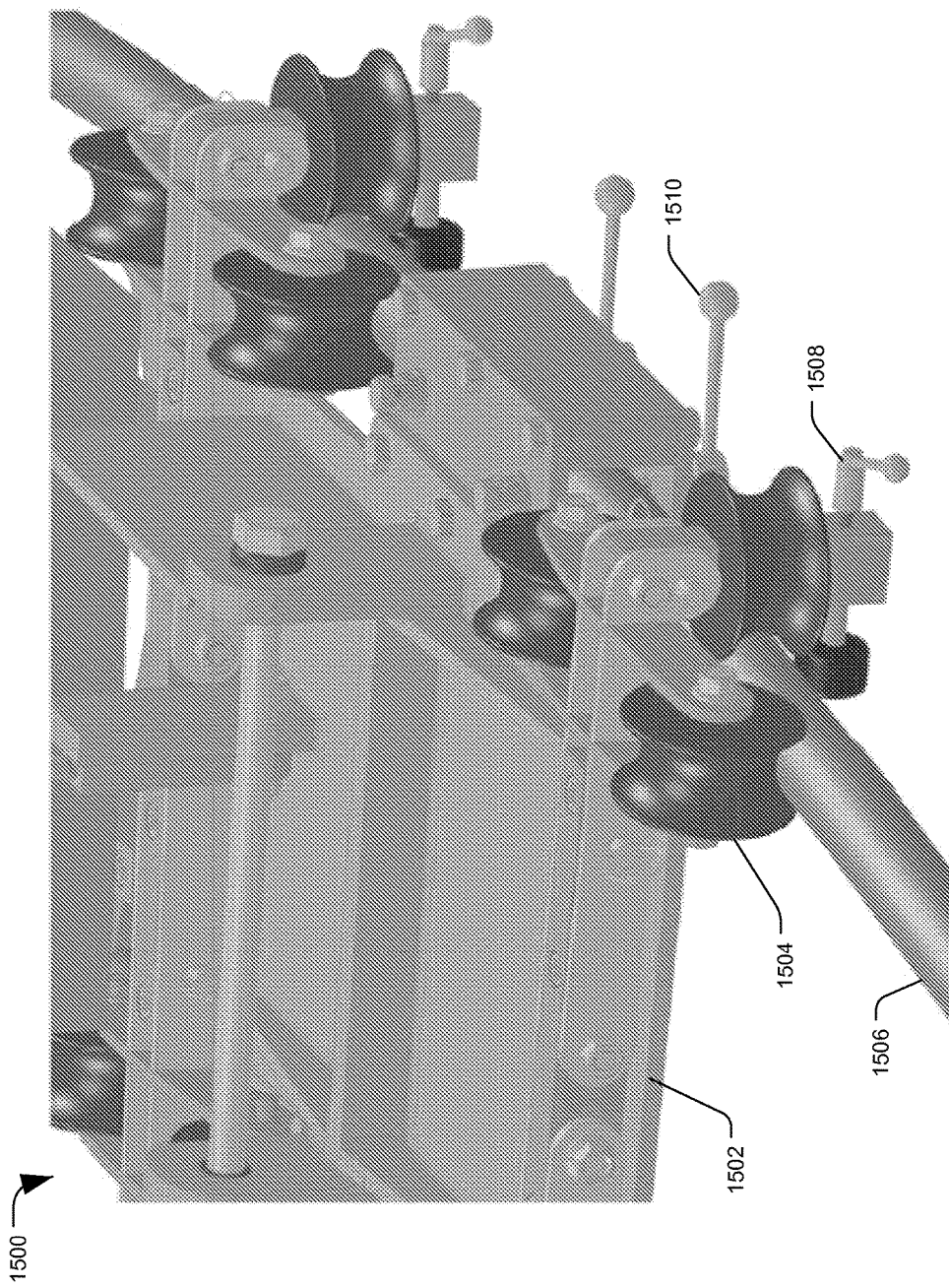
FIG. 15 is a diagram of a system for spray printing construction, in accordance with certain embodiments of the present disclosure.

FIG. 15 depicts a system 1500 for spray printing construction, in accordance with certain embodiments of the present disclosure. In particular, FIG. 15 depicts another view of an example base carriage 1502. Base carriage 1502 may include a plurality of wheels 1504 to ride on and securely grasp base rails 1506. Base carriage 1502 may include one or more wheel lock elements 1508 or other locking elements 1510 to secure the base carriage 1502 in place on the base rail 1506 and prevent undesired movement.

Figure 16:
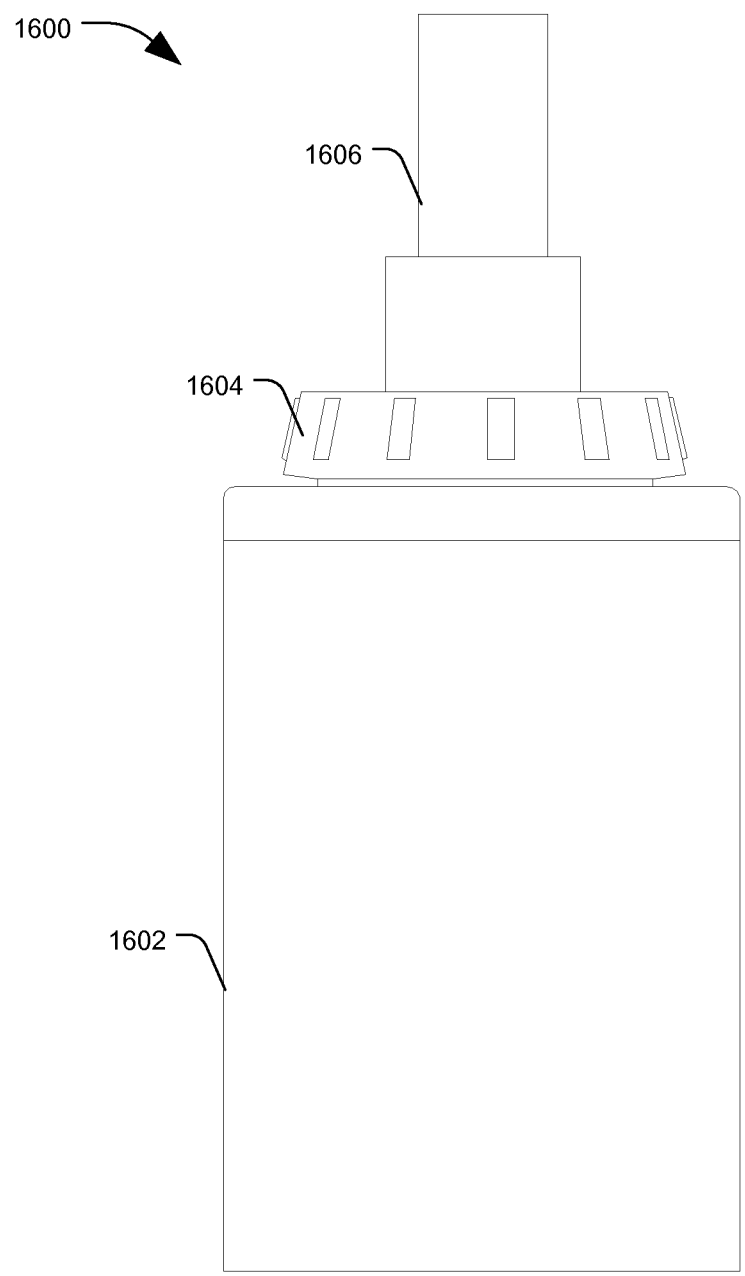
FIG. 16 is a diagram of a system for spray printing construction, in accordance with certain embodiments of the present disclosure.

In some embodiments, the rotating arch may pivot around a central shaft. Examples of the central shaft and its junction with the rotating arch will be discussed in relation to FIGS. 16-18. Turning now to FIG. 16, a system 1600 for spray printing construction is shown, in accordance with certain embodiments of the present disclosure. In particular, system 1600 may include the top of a central mast or shaft of an arched spray printing system, which central mast 1602 may correspond to central mast 104 of FIG. 1. The central mast 1602 may include a bearing element 1604, which may be configured to smoothly rotate. The central shaft 1602 may also include a union or joining element 1606, which may be configured to be inserted into and join with a pivot joint at the apex of an arched truss system. For example, the joining element 1606 may be inserted into pivot joint 114 of FIG. 1. The central shaft 1602 may provide load-bearing support for the rotating arch system, and in some embodiments may also provide a conduit to bring material or electricity to the top of the arch system without potentially tangling tubes and wires in the rotating arch. For example, joining element 1606 may also include a port or hole through which material may be pumped or tubes or cords may be run. The bearing element 1604 may support the arch and allow the arch to rotate on the central shaft 1602 without requiring the shaft itself to rotate.

Figure 17:
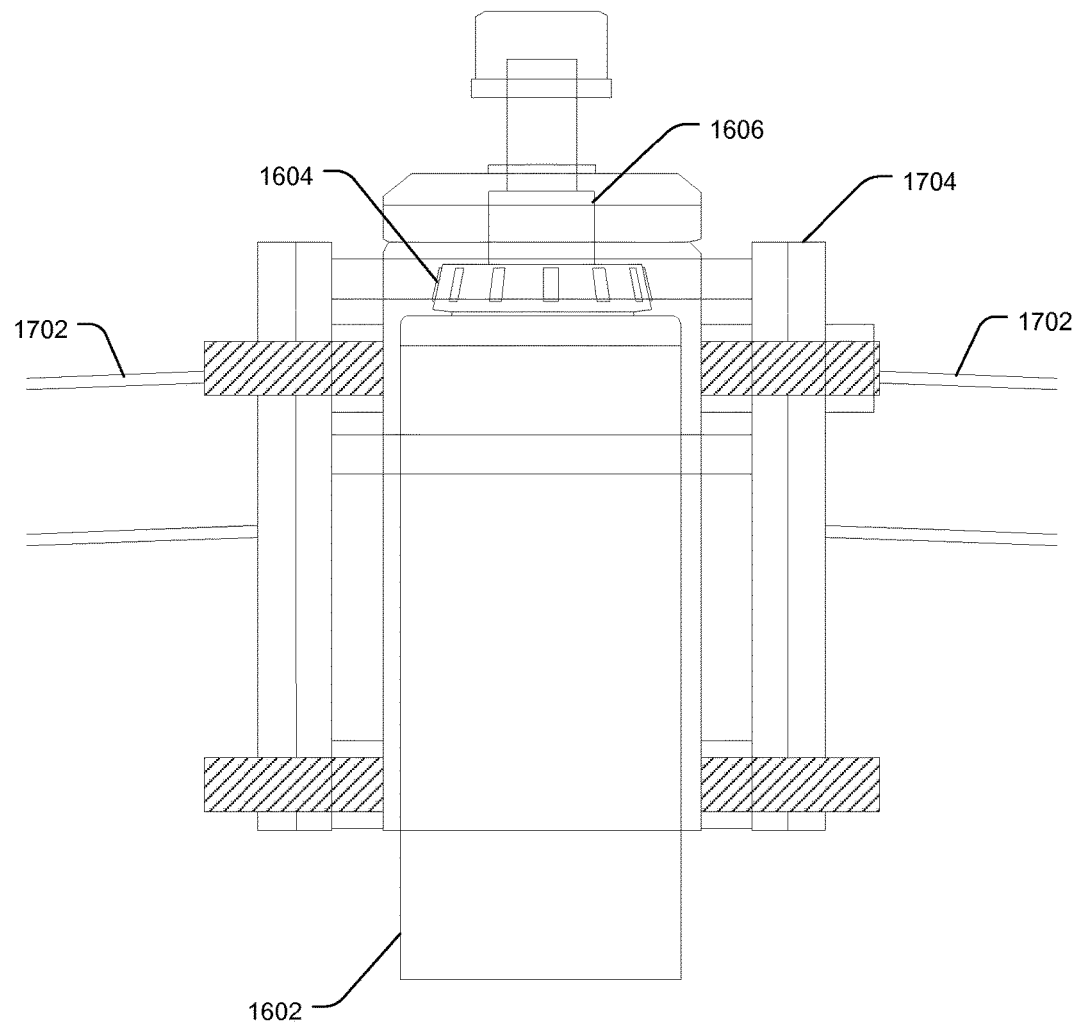
FIG. 17 is a diagram of a system for spray printing construction, in accordance with certain embodiments of the present disclosure.

FIG. 17 depicts a system 1700 for spray printing construction, in accordance with certain embodiments of the present disclosure. In particular, FIG. 17 depicts a cross-sectional view of the central shaft 1602 of FIG. 16 inserted or coupled with a pivot joint 1704 of a rotating arch system.

As depicted in FIG. 16, central shaft 1602 may include a bearing element 1604 and a joining element 1606 at the top end of the shaft 1602. The arched truss system may include rails 1702 that are joined together by a pivot joint 1704, which may correspond to pivot joint 114 of FIG. 1. The pivot joint 1704 may comprise a primarily hollow shaft, including a downward-facing opening to receive the top of the central shaft 1602, including the bearing element 1604 and the joining element 1606. The pivot joint 1704 may rest on the bearing element 1604 to receive support, and about which the arch system may rotate. The joining element 1606 may provide a more secure union between the central shaft 1602 and the pivot joint 1704.

Figure 18:
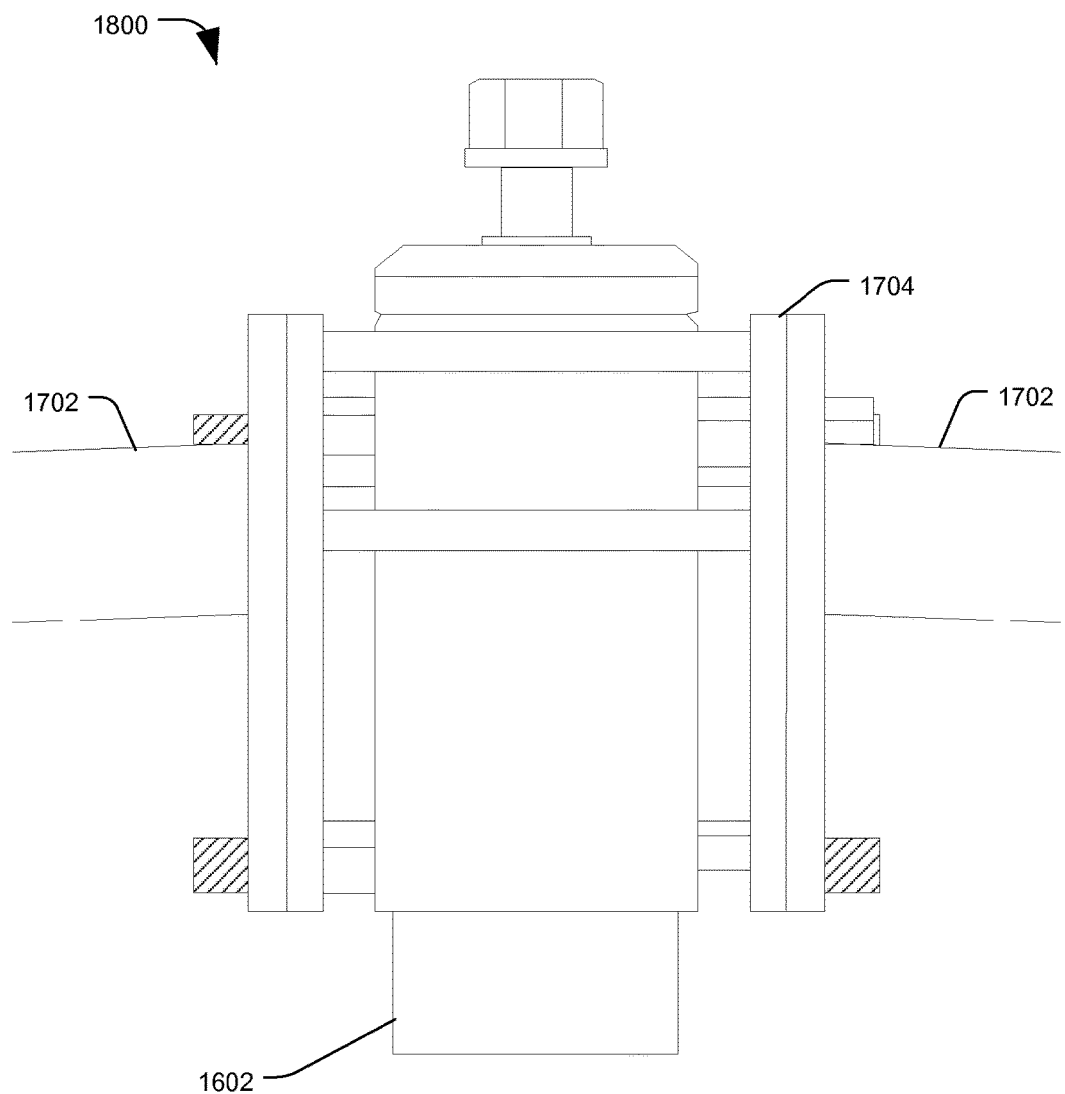
FIG. 18 is a diagram of a system for spray printing construction, in accordance with certain embodiments of the present disclosure.

FIG. 18 depicts a system 1800 for spray printing construction, in accordance with certain embodiments of the present disclosure. In particular, FIG. 18 depicts a non-cross-sectional view of the central shaft 1602 coupled with the pivot joint 1704 of FIG. 17. A portion of the central shaft 1602 is shown protruding from the bottom of the pivot joint 1704. The pivot joint 1704 is situated between and joins rails 1702 of the arched truss system.

The central shaft 1602 may remain stationary, while the arched truss 1702 and pivot joint 1704 rotate around the central axis defined by the central shaft 1602. The pivot joint 1704 and arched truss 1702 may be supported by and rotate on the bearing element 1604 of the central shaft (not shown).

Figure 19:
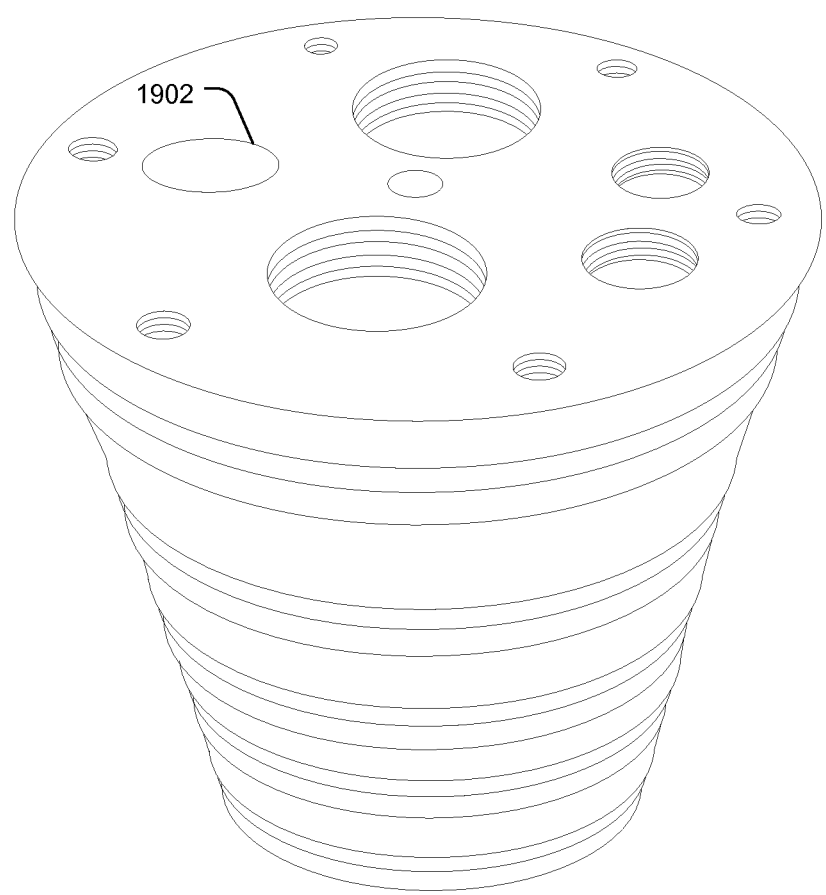
FIG. 19 is a diagram of a system for spray printing construction, in accordance with certain embodiments of the present disclosure.

In some embodiments, the central shaft 1602 or the pivot joint 1704 may include a rotary union, such as the rotary union 436 depicted in FIG. 4. An example rotary union will be described in relation to FIGS. 19 and 20. FIG. 19 depicts an example embodiment of a multiport rotary union 1900. A union may be a coupling device configured to allow quick and convenient connection and disconnection of tubing, wires, pipes, similar conduits, or any combination thereof. For example, a first tube may be connected to a first end of rotary union 1900, and a second tube may be connected to a second end of rotary union 1900, allowing material to pass from the first tube to the second tube via the rotary union 1900. In addition to coupling tubing, a rotary union may also permit the free rotation of the united parts. It may therefore provide a seal between a stationary supply passage (such as pipes or tubing) and a rotating element (such as the rotating arch system).

In the depicted embodiment, hoses, tubing, or other conduits may be attached to the outlets 1902 of the rotary union 1900, and material may be conveyed to conduits attached to outlets on the opposite end of the rotary union 1900. Rotary union 1900, such as a multi-port multi-channeled electrical union, can be used as a mechanism for the transfer of materials, electrical power, and control signals to the rotary gantry, and, thereby, to the application head or sprayer head, base and arch carriages, or other components. For example, the multi-port multi-channel union 1900 may be located in a central mast located at an approximate center of the base track and about which the rotating arch may rotate. In some embodiments, material and power may be fed up through the mast to the rotating arch and head assemblies. In an example embodiment, the rotary union 1900 may be positioned at the top of central shaft 1602 or pivot joint 1704 of FIG. 17, allowing setting material, power, or other resources to be pumped up the central shaft 1602 and distributed to the rotating arch system. In some embodiments, material may be provided to the pivot joint 1704 via other means, such as from overhead using a raised crane. Other embodiments are also possible.

Figure 20:
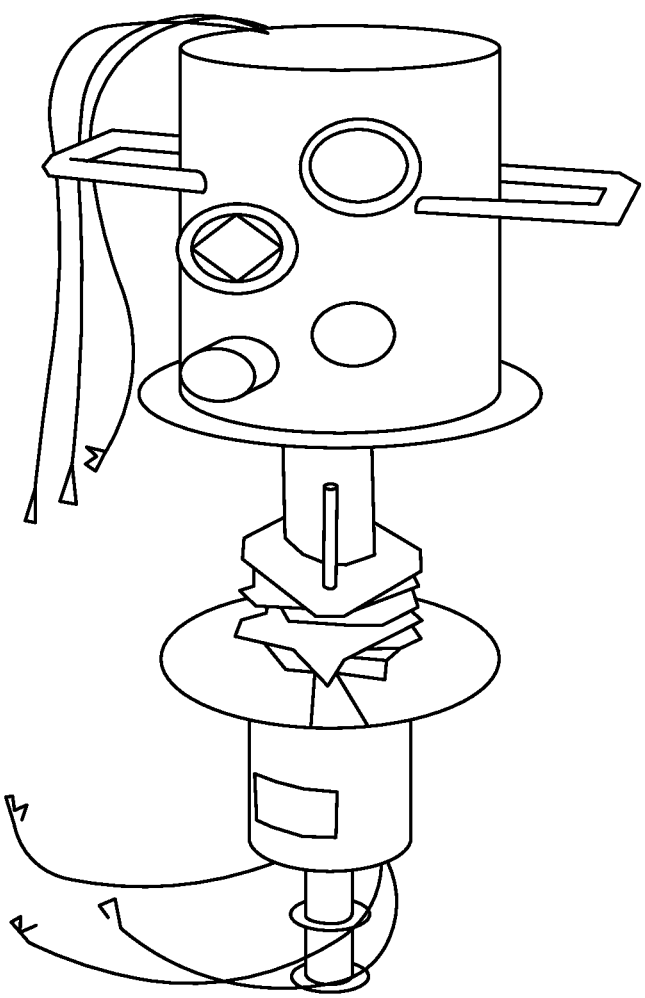
FIG. 20 is a diagram of a system for spray printing construction, in accordance with certain embodiments of the present disclosure.

FIG. 20 depicts another example embodiment of a multiport rotary union 2000. Once again, the rotary union 2000 may be used for material and power transmission to the rotating arch, where the resources may then be provided to, e.g. the arch carriages or base carriages for operation. In some embodiments, the rotary union 2000 may also be used to provide wired communication to the arch carriages or base carriages from a computer controller located external to or at the base of the rotating arch.

In some embodiments, the rotating printing system may include implementations instead of or in addition to a rotating arch system. FIG. 21 depicts an example a system 2100 for spray printing construction, in accordance with certain embodiments of the present disclosure. For example, another feature of the printer system 2100 may be a bridge truss 2102 that rides on motorized carriages, such as the base carriages (or x-axis carriages) 2104 on the base track or base rail 2106.

The bridge truss 2102 may include a horizontal truss spanning the base track 2106 between carriages 2104, and need not be arched. For example, the printing system 2100 may include a horizontal bridge truss 2102 as well as a separate arch. The base carriages 2104 used by the bridge truss 2102 may be the same carriages used to support and rotate the arch truss assembly. For example, the base carriages 2104 may have joining hinges or unions to connect to truss systems, and both the horizontal bridge truss 2102 and an overhead arch truss may be connected to the base carriages 2104, depending on the current construction needs. Other embodiments are also possible.

The bridge truss 2102 can carry a printer head or sprayer assembly 2108 for delivering and placing material. The printer head 2108 may correspond to or have similar elements to arch carriage 406 of FIG. 4, including a controller or processor, an interface, material pumps, carriage motors, sensors, sprayers, additional actuators, other elements, or any combination thereof. For example, the printer head 2108 may be used to automatically place a foundation or floor, apply a finisher to the floor, and add additional coatings or decoration. In some embodiments, the printer head 2108 may have high detail color depositing capabilities such as in an ink jet color printer. Additional attachments or actuators may include motorized engraving tools for decorative highlighting, and polishing attachments or actuators.

In some embodiments, the bridge truss 2102 and print head 2108 can be vertically adjustable, such as using one or more motors and a system of vertical rails 2110, allowing for the vertical printing of walls and other elements of the structure.

In some embodiments, the spray printing construction system 2100 may include a dedicated apparatus or system for printing foundations, flooring, and similar elements. For example, the flooring system may include a circular base track 2106, carriages on the track 2104, and the bridge truss 2102, and may include the ability to relocate and work on a next building foundation while the arched dome printer is assembled and prints the dome structure on the printed floor. In an example embodiment, the flooring system, the arched system, or both may include mechanisms for relocation without disassembling the system. For example, a system of motorized wheels, treads, robotic legs (e.g. in a hexapod arrangement), or other implements may be used relocate the base track 2106 and printer, allowing for further ease and automation of building construction. For example, the system may include global positioning system (GPS) receivers and computer mapping or development layouts to automatically determine a location of a next building site, and relocate automatically. In some embodiments, the separate flooring system may also include self-leveling elements as described herein.

Once the floor materials are placed and finished, a resist material may be placed that may allow the placement of materials to define and create walls and building sections that can then be erected after the dome is fully formed. For example, the resist material may be sprayed onto the flooring to prevent bonding of material sprayed over the resist material. In this manner, dividing walls or other elements may be sprayed onto the resist material, allowed to set, and then lifted into place within the structure.

The spray printing construction system as described in the various embodiments herein may employ a variety of material components for building fabrication. For example, materials may include various hemp cements, ceramic cements, and geopolymer cementitious materials, which may be used to achieve a fast-setting, high-performance structural base. Due to the rapid and accurate application of material with the printer assembly, materials may be used that would otherwise set too rapidly for building purposes, such as ceramic cements. Material combinations such as hemp fiber with geopolymers or ceramic cements may also be used. In some embodiments, traditional cements, such as Portland cement or other printable materials may also be used. In some embodiments, Ultra High Performing Concretes (UHPC), sometimes known as reactive powder concrete (RPC), may also be used.

In some embodiments, nanoparticles may be used as part of the building material formulation matrix, which can significantly increase performance characteristics. For example, silica fume and other nanoparticles may be used. In another example, hemp nanoparticles can provide high tensile strength and modulus figures in the 100-200 MPa (megapascal) range. For example, 100 MPa may equal approximately 14,503.773 psi (pounds per square inch).

Another application may be printing nanoparticle components, such as nanosheets, into the overall building matrix. For example, interconnected carbon nanosheets derived from hemp for energy storage as supercapacitors with high energy density may be printed into the matrix of the structures. Integrating high energy storage as part of the structural elements of a building may make that building energy independent permanently. For example, printing nanoscale particles may be accomplished through the use of depositing carrier solutions, therefore enabling the coverage of large areas through an intermediary medium.

The use of geopolymer foam insulating compositions deposited in multiple layers may be used to achieve a specified insulating value automatically, using a specially designed foam dispensing and leveling nozzle. For example, the foam dispensing nozzle may include a leveling adapter allowing for applying the foam and leveling it in one motion or pass of the spray head. The leveling adapter may include elements such as a nozzle hood or trowel for spreading and leveling the applied foam. An application of a final structural and sealing surface coat over the foam can provide a final structural and aesthetic finish.

The combination of multi-layered ceramic cement, geopolymer foam, and a polyurea surface coating may be used to achieve unprecedented structural, thermal, and cost performance. These formulations can be tailored to specific requirements of specialized applications, but are not limited to any particular formulation matrixes.

Various materials have been discussed, but the spray printing construction system may be used for any material that can be sprayed or applied in a building fabrication environment. For example, the sprayer apparatus may be capable of applying paint coatings, varnish, sealant, or other materials as well as setting materials, metals or other materials as described herein.

A spray printing construction device as described herein may be designed for any scale to produce structures of a desired size. The adjustable z-axis position of the sprayer apparatuses may allow a single spray printing construction apparatus to be used to fabricate structures at a variety of sizes, whether small or large.

Figure 22:
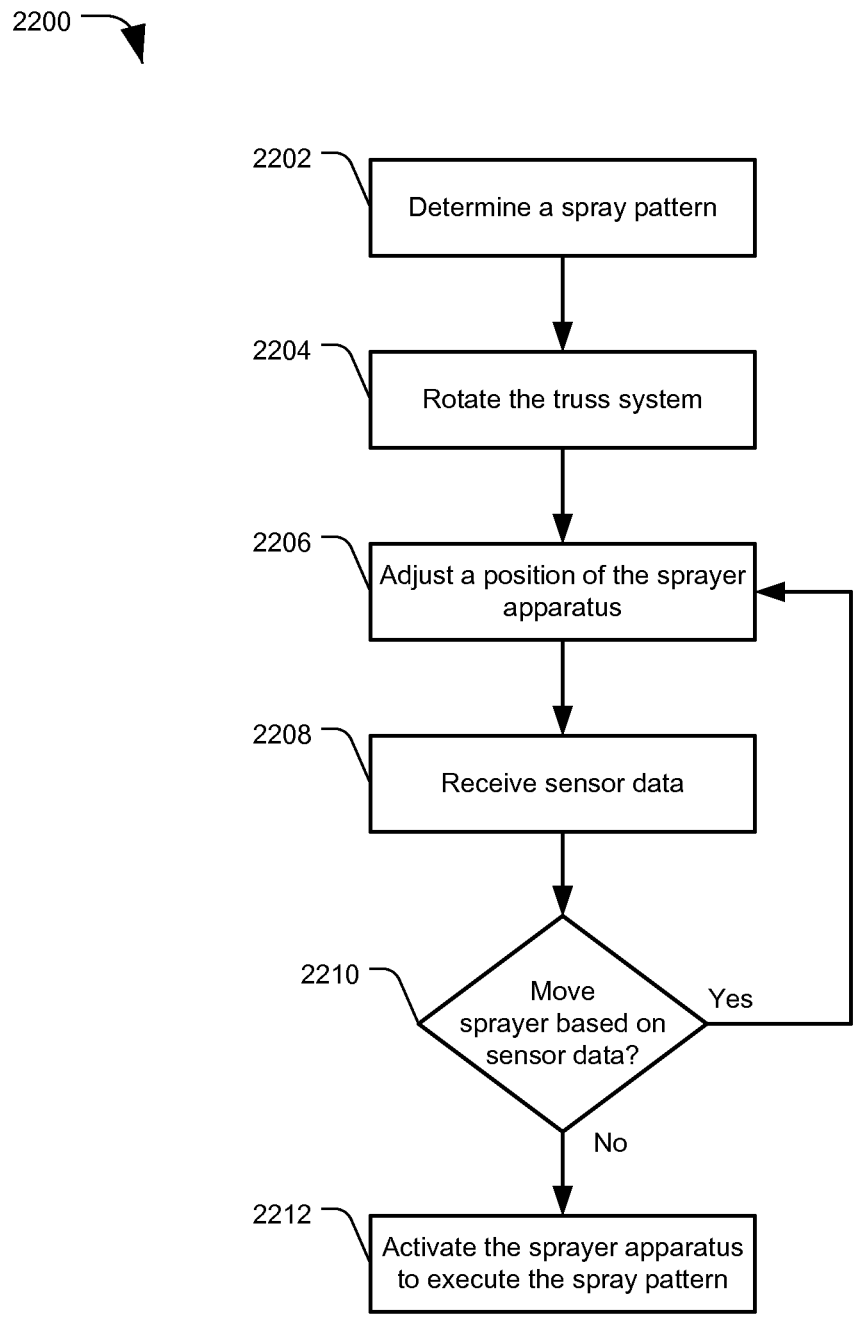
FIG. 22 is a flowchart of a method for spray printing construction, in accordance with certain embodiments of the present disclosure.

Turning now to FIG. 22, a flow diagram of a method 2200 for spray printing construction is shown, in accordance with certain embodiments of the present disclosure. Method 2200 may include determining a spray pattern, at 2202. For example, computer design instructions may be entered into a computer control system, including desired building specifications. The computer control system may also load operating instructions and parameters for a spray printing apparatus which may be used in conjunction with the design instructions to fabricate the building. In some embodiments, a user may be able to designate or design a spray pattern, which may then be automatically implemented by a computer control system. Other embodiments are also possible.

Method 2200 may include rotating the truss system, at 2204. For example, once a spray pattern is determined, a computer control system may send instructions to synchronized base carriages on a base rail to move into a desired position, which may rotate an arched truss system and associated sprayers into a selected alignment to begin or continue a spraying operation. At 2206, one or more sprayer apparatuses may also be moved into a selected position along the truss system, for example by providing instructions to move arch carriages supporting the sprayers, instructions to adjust an orientation of the sprayer, other instructions, or any combination thereof.

Method 2200 may include receiving sensor data, at 2208. For example, distance or thickness sensors located on or near a sprayer may be used to determine a position or other properties of a spraying surface. The sensor data may be provided to a computer controller. Based on the sensor data, the method 2200 may include determining whether the sprayer should be moved, at 2210. For example, this may include changing a distance or orientation of the sprayer. If a determination is made to move the sprayer, the method may include adjusting the sprayer position at 2206. If a determination is made not to move the sprayer, at 2210, the method 2200 may include activating the sprayer apparatus to execute the spray pattern, at 2212. Executing the spray pattern may include continuing to adjust a position of the truss system and sprayer apparatus, based on the building design, spray printer control instructions, operating guidelines, and other factors, in order to fabricate to selected building design.

Figure 23:
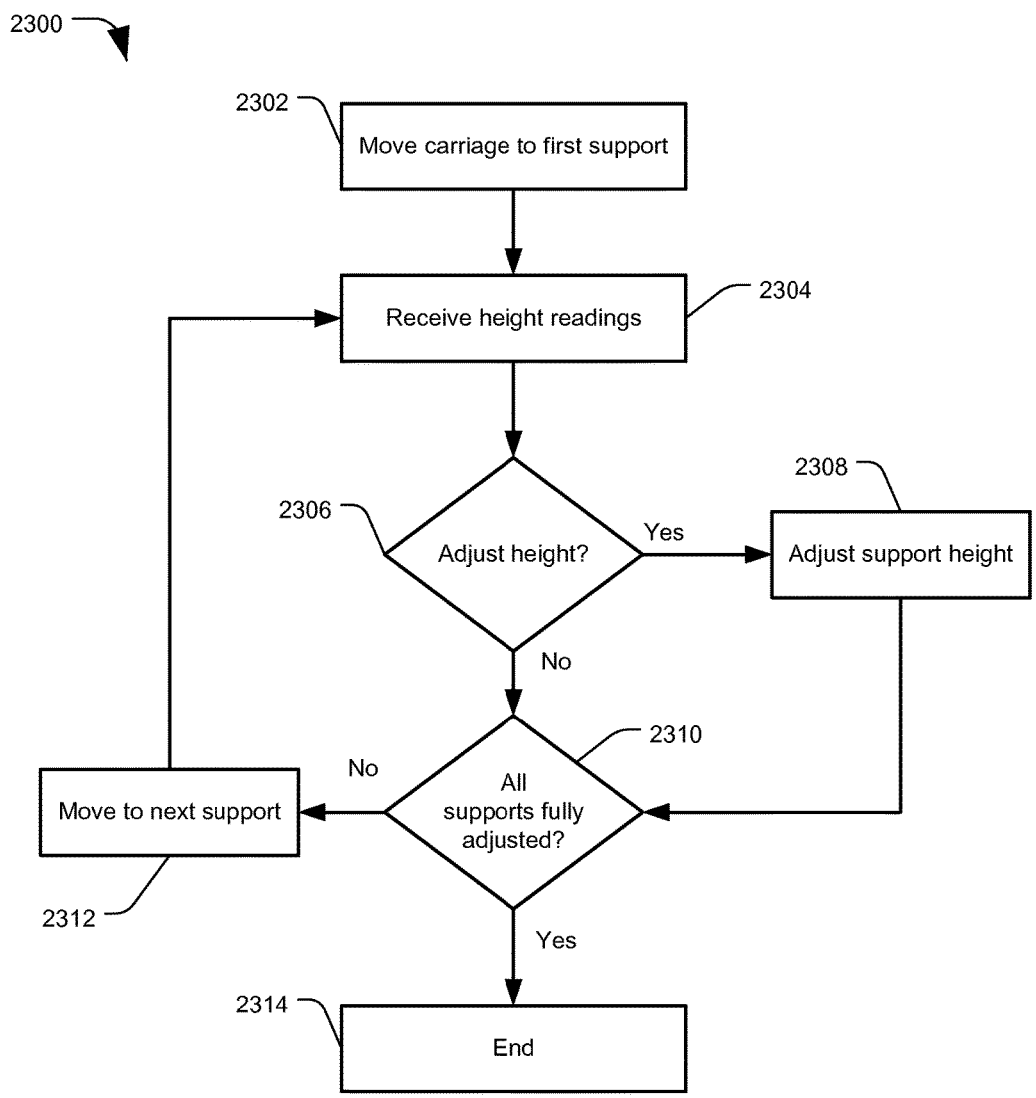
FIG. 23 is a flowchart of a method for spray printing construction, in accordance with certain embodiments of the present disclosure.

FIG. 23 depicts a flow diagram of a method 2300 for spray printing construction, in accordance with certain embodiments of the present disclosure. In particular, method 2300 may comprise an example embodiment of a self-leveling system for a base track or rail. The method 2300 may include moving a carriage to a first track support, at 2302. For example, the carriage may include a hook stop to catch a crossbeam having an associated adjustable support element for the base track. In some embodiments, sensors may be used to determine when an adjustable support is encountered, and to stop the carriage motor at those locations.

At 2304, the method may include receiving height readings. For example, a laser level may be placed at the center of the base track, and the laser readings may be used to determine rail height. In other embodiments, other sensors may be used to determine a height of the rail or carriage, such as high-precision altimeters or satellite data. The height readings may indicate whether the base track is above or below a selected height threshold.

Based on the height readings, the method 2300 may include determining whether to adjust the height of the support, at 2306. If the height readings do indicate that the support should be raised or lowered, the method may include adjusting the support height, at 2308. After adjusting the height at 2308, or if the height does not need to be adjusted at 2306, then the method may include determining whether all supports have been fully adjusted, at 2310. For example, this may include counting a number of supports that have been adjusted, or measuring a position of the carriage to determine when a full rotation has been performed. In some embodiments, each support may be adjusted twice or more—with each repeated adjustment having a more fine or precise height threshold. If all supports have not been adjusted, the method 2300 may include moving to the next support, at 2312, and repeating the method from 2304. If all supports have been fully adjusted, the method may end, at 2314.

In accordance with various embodiments, the methods and processes described herein may be implemented as or controlled by one or more software programs running on a computer processor, circuit, or controller device. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments blocks may be removed or combined without departing from the scope of the disclosure. Further, structural and functional elements within the diagram may be combined, in certain embodiments, without departing from the scope of the disclosure. For example, certain modules and components may be combined, or split into sub-components. Functionality assigned to a particular component or module may be handled by another component instead. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a circular base track including at least one rail formed into a loop that defines a circular area within the loop on a substantially horizontal surface upon which the circular base track is situated;
   a rotating truss spanning the circular area within the circular base track and having a first end movably connected to a first point on the loop and having a second end movably connected to a second point on the loop that is approximately diametrically opposed to the first point, the rotating truss configured to rotate by moving the first end and the second end synchronously along the circular base track;

a sprayer apparatus configured to connect to and move along the rotating truss; and a processor circuit configured to:
execute computer instructions to print a building structure in the circular area within the circular base track using the sprayer apparatus and the rotating truss.

2. The system of claim 1 configured to print the building structure using a cementitious setting material.

3. The system of claim 1 further comprising:
the sprayer apparatus includes a distance sensor to determine a distance between the sprayer apparatus and a target spraying surface; and
the processor circuit configured to adjust the behavior of the sprayer apparatus based on the determined distance.

4. The system of claim 1 further comprising:
the sprayer apparatus includes a thickness sensor to determine a thickness of material previously sprayed by the sprayer apparatus; and
the processor circuit configured to adjust the behavior of the sprayer apparatus based on the determined thickness.

5. The system of claim 1 further comprising:
the sprayer apparatus includes a spooling end actuator for placement of reinforcing fibers in the building structure.

6. The system of claim 1 further comprising:
the sprayer apparatus includes:
a hose sprayer for applying cementitious setting material; and
a thermal spraying end actuator for application of heated material to the building structure.

7. The system of claim 1 further comprising:
the sprayer apparatus includes an ultrasonically vibrating spray nozzle.

8. The system of claim 1 further comprising:
the sprayer apparatus includes:
a carriage configured to interface with and move along the rotating truss;
a sprayer nozzle configured to:
rotate relative to the carriage; and
adjust a distance relative to a target spray surface.

9. The system of claim 1 further comprising:
a pair of base carriages configured to engage and synchronously move along the circular base track, each of the base carriages further configured to support an end of the rotating truss; and
the processor circuit further configured to rotate the rotating truss using the base carriages.

10. The system of claim 9 further comprising:
the rotating truss includes a horizontal bridge truss; and
the pair of base carriages are further configured to support opposite ends of the horizontal bridge truss.

11. The system of claim 9 further comprising:
the circular base track includes support feet having adjustable height; and
at least one base carriage of the pair of base carriages includes a motor configured to adjust a height of the support feet.

12. The system of claim 11 further comprising:
the at least one base carriage includes a laser sensor for receiving readings from a laser level; and
the processor circuit further configured to control the at least one carriage to adjust the height for the support feet based on the readings.

13. The system of claim 1 further comprising:
the rotating truss includes an arch-shaped rotating truss; and
a rotary union located at the apex of the arch-shaped rotating truss and configured to receive material at an input and provide the material from an output to the sprayer apparatus.

14. The system of claim 13 further comprising:
a central mast providing to interface with the arch-shaped rotating truss and providing a conduit for the materials to the rotatory union.

15. An apparatus comprising:
a substantially circular base track including at least one rail formed into a loop that defines a circular area within the loop on a substantially horizontal surface upon which the base track is situated;
a set of base carriages configured to interface with the base track at approximately diametrically opposed sides of the base track, and to move synchronously on the base track;
an arched truss spanning the circular area within the base track and having a first end and a second end supported on the set of base carriages, the arched truss configured to rotate as the base carriages move on the base track;
a spray printing apparatus configured to:
apply a spray of setting material for fabricating a dome structure;
move along the arched truss; and
a processor configured to operate the base carriages and the spray printer apparatus based on building design instructions to fabricate the dome structure in the circular area within the base track.

16. The apparatus of claim 15 comprising the processor further configured to:
determine a spray pattern for creating the dome structure;
implement the spray pattern to create the dome structure, including:
rotate the arched truss supporting the spray printing apparatus;
adjust a position of the spray printing apparatus on the arched truss; and
activate the spray printing apparatus to execute the determined spray pattern.

17. The apparatus of claim 16, the processor further configured to:
receive distance sensor data indicating a distance between the spray printing apparatus and a target spray surface; and
adjust the position of the spray printing apparatus based on the distance sensor data.

18. The apparatus of claim 16 further comprising:
the processor configured to rotate the arched truss by controlling the set of base carriages to move synchronously on the base track.

19. The apparatus of claim 15 comprising the processor further configured to:
perform a self-leveling operation on the base rail, including:
move at least one of the base carriages to a support element of the base track;
determine a height of the base track at the support element;
adjust a height of the support element to within a designated height threshold; and move the at least one of the base carriages to a next support element to repeat the self-leveling operation.

20. The apparatus of claim 15 comprising the processor further configured to:
activate the spray printing apparatus to apply a cementitious setting material to a base dome structure; and
activate an actuator proximate to the spray printing apparatus to apply at least one additional material separate from the setting material.

\* \* \* \* \*